United States Patent
Pesavento et al.

(10) Patent No.: US 7,733,227 B1
(45) Date of Patent: Jun. 8, 2010

(54) RFID TAGS CIRCUITS AND METHODS FOR SENSING OWN POWER TO PREDETERMINE FEASIBILITY OF REQUESTED ACTION

(75) Inventors: Alberto Pesavento, Seattle, WA (US); Vadim Gutnik, Irvine, CA (US); John D. Hyde, Corvallis, OR (US)

(73) Assignee: Impinj, Inc., Seattle ( * ) Notice: Subject to any disclaimer, the term of this patent is extended or adjusted under 35 U.S.C. 154(b) by 676 days.

(21) Appl. No.: 11/624,197

(22) Filed: Jan. 17, 2007

Related U.S. Application Data

(60) Provisional application No. 60/761,016, filed on Jan. 19, 2006.

(51) Int. Cl.
*G08B 13/14* (2006.01)

(52) U.S. Cl. .............. 340/572.1; 340/10.1; 340/825.71; 340/7.37

(58) Field of Classification Search .............. 340/572.1, 340/10.1, 10.5, 825.71, 825.76, 7.36, 7.37, 340/10.34; 235/492
See application file for complete search history.

(56) References Cited

U.S. PATENT DOCUMENTS

| | | | | |
|---|---|---|---|---|
| 5,627,528 A | * | 5/1997 | Kuznicki | 340/7.22 |
| 7,019,617 B2 | * | 3/2006 | Pratt et al. | 340/10.1 |
| 2006/0176152 A1 | * | 8/2006 | Wagner et al. | 340/10.2 |
| 2008/0100423 A1 | * | 5/2008 | Geissler et al. | 340/10.1 |

OTHER PUBLICATIONS

A) Epcglobal, Inc. "Specification for RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec".) EPCglobal Inc., Dec. 17, 2005. http://www.epcglobalinc.org.
(B) Epcglobal Inc. "Specification for RFID Air Interface-EPC Radio-Frequency Identity Protocols Class-1 Generation-2 UHF RFID Protocol for Communications at 860 MHz-960 MHz, Version 1.0.8." EPCglobal Inc., Dec. 14, 2004. http://www.epcglobalinc.org.
(C) Declaration of Stacy L. Jones authenticating attached Website Materials as accessed and posted at http://www.autoid.org/SC31/sc_31_wg4_sg3.htm on Sep. 1, 2006.

* cited by examiner

*Primary Examiner*—Toan N Pham
(74) *Attorney, Agent, or Firm*—Turk IP Law, LLC

(57) ABSTRACT

Feasibility of a requested action by a reader is predetermined in an RFID tag based on an available tag power level. A pretest that is designed to consume artificially high levels of power is performed and the power level monitored to determine if a preset condition is met. The pretest may include activation of selected components such as a memory and associated support circuitry. If the preset condition is not met, the requested action is aborted and an error message transmitted to the reader.

76 Claims, 21 Drawing Sheets

POWER VERIFICATION BY
PMU IN A TAG

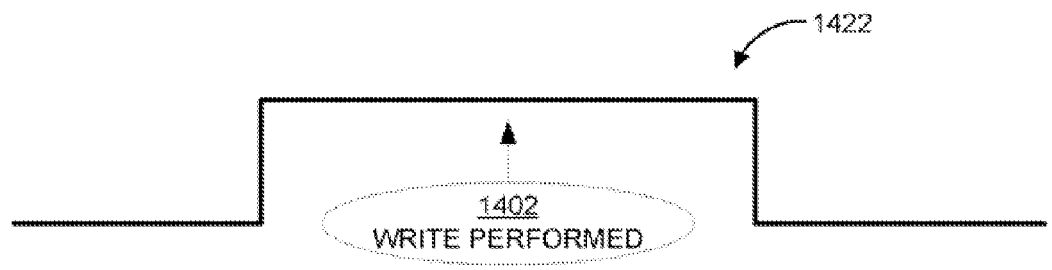
FIGURE 14A
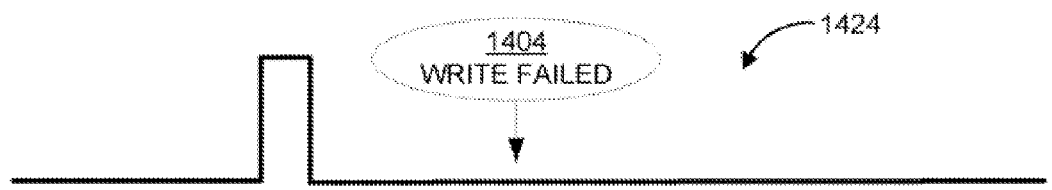
FIGURE 14B
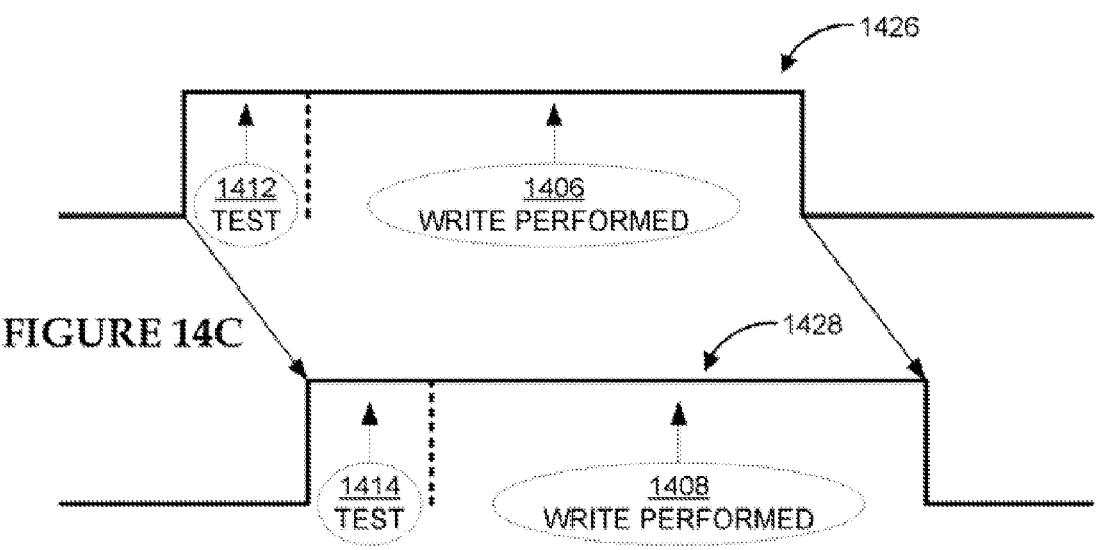
FIGURE 14C
FIGURE 14D
*COMPARISON OF WRITE COMMAND OPERATIONS WITH AND WITHOUT TESTING*

US 7,733,227 B1

RFID TAGS CIRCUITS AND METHODS FOR SENSING OWN POWER TO PREDETERMINE FEASIBILITY OF REQUESTED ACTION

RELATED APPLICATIONS

This utility patent application claims the benefit of U.S. Provisional Application Ser. No. 60/761,016 filed on Jan. 19, 2006, which is hereby claimed under 35 U.S.C. §119(e). The provisional application is incorporated herein by reference.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a data, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

Operations performed by RFID tags consume power, which is at a premium. For example, WRITE operation for storing data to a Non-Volatile Memory (NVM) consumes a lot of power, and once it is started it should preferably be finished before the tag runs out of power.

Writing to the NVM may consume more power than doing some other tag operations. Writing may also take a long time compared to other reader-tag communication. If the tag runs out of power during a write operation, the time has been wasted, and it is possible that data on the tag has been corrupted. It is beneficial, therefore, to not start a tag write operation if there will not be sufficient power to finish it.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to predetermining a feasibility of a requested action in an RFID tag based on an available power level. According to some embodiments, a pretest that is designed to consume artificially high levels of power may be performed and the power level monitored to determine if a preset condition is met. The pretest may include activation of selected components such as a memory and associated components. Other embodiments may include monitoring a voltage level as pretest conditions are applied.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

FIGS. 14A-14D illustrate comparatively performing a power verification test according to embodiments may affect WRITE operations in an RFID tag.

DETAILED DESCRIPTION

Figure 1:
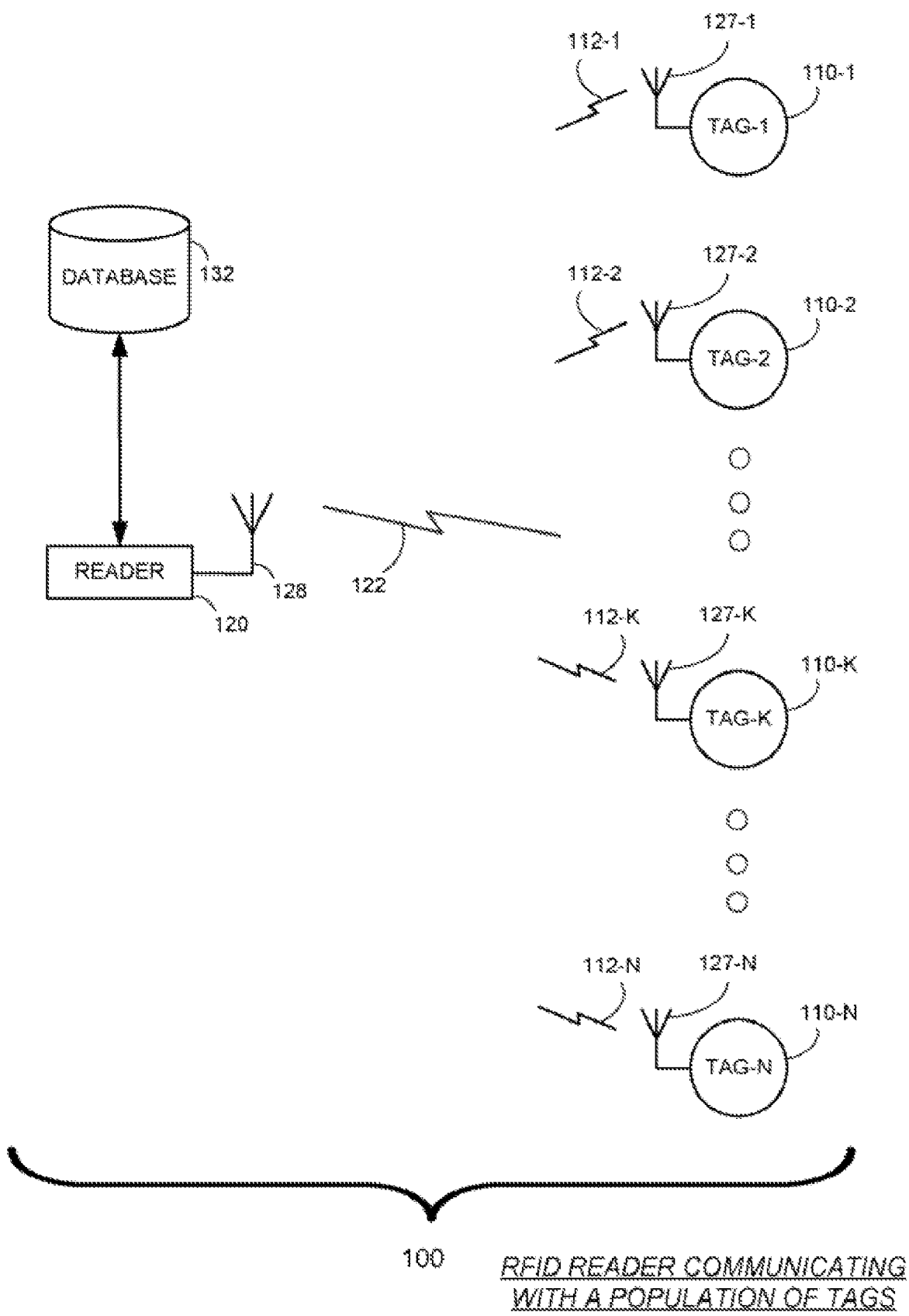
FIG. 1 is a diagram of an example RFID system including an RFID reader communicating with RFID tags in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

FIG. 1 is a diagram of an example RFID system including an RFID reader communicating with RFID tags in its field of view. An RFID reader 120 transmits an interrogating Radio Frequency (RF) wave 122. RFID tags 110-X (X representing a number between 1 and N) in the vicinity of RFID reader 120 may sense interrogating RF wave 122, and generate wave 112-X in response. RFID reader 120 senses and interprets wave 112-X.

Reader 120 and tags 110-X exchange data via wave 122 and wave 112-X. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 120 and tag 110-X, they can be equivalently considered and treated as numbers having corresponding values, and so on.

Tag 110-X can be a passive tag or an active tag, i.e. having its own power source. Where tag 110-X is a passive tag, it is powered from wave 122.

Reader 120 may communicate with database 132 to retrieve and store information associated with the communication and transmit wave 122 through its antenna 128.

Figure 2:
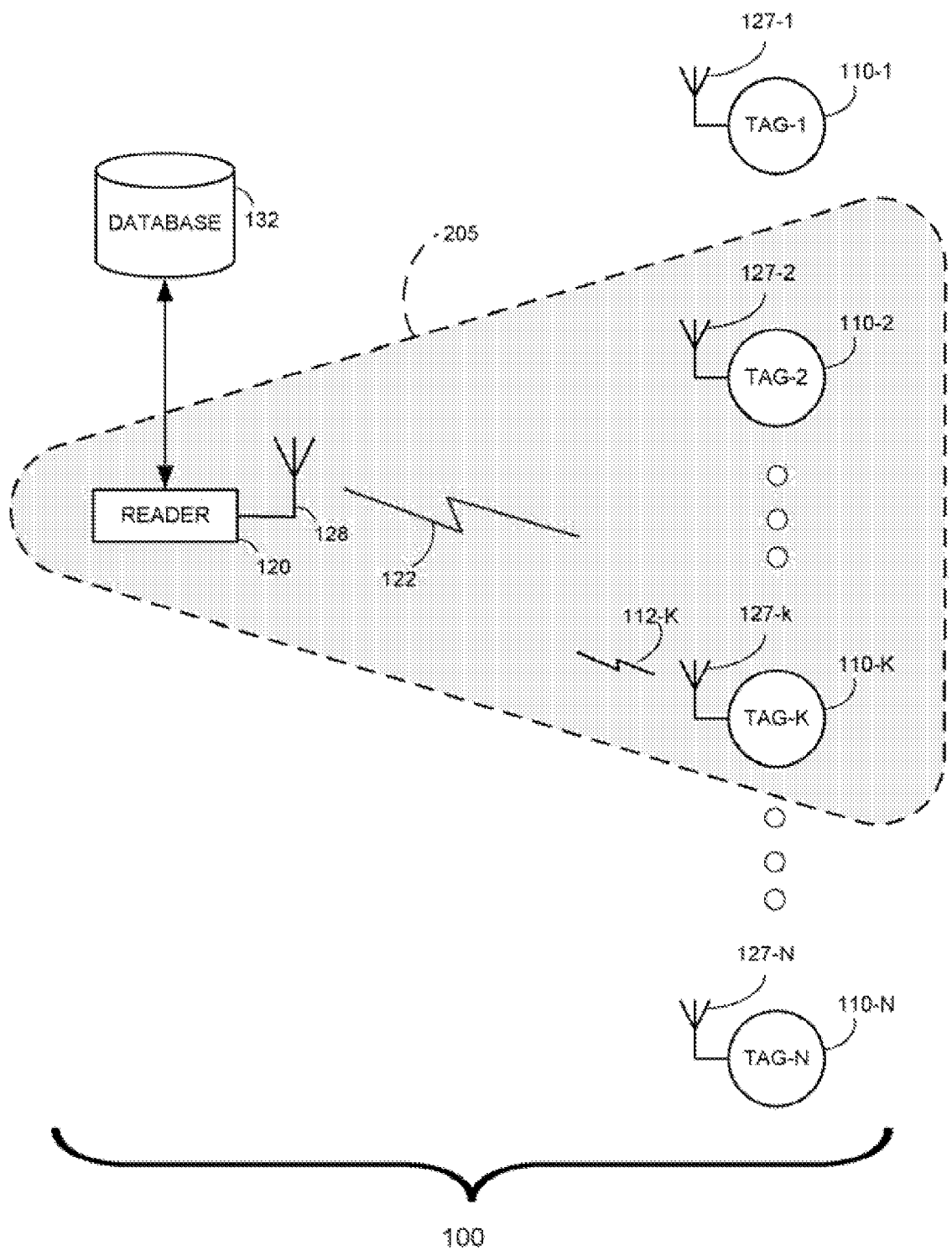
FIG. 2 is a diagram of the RFID system of FIG. 1 with the RFID reader selecting a subpopulation of tags.

FIG. 2 is a diagram of the RFID system of FIG. 1 with the RFID reader selecting a subpopulation of tags. In addition to the system 100 of FIG. 1, a subpopulation of RFID tags comprising tags 110-2 through 110-K have been selected by reader 120, as shown by relationship 205. This selection enables reader 120 to singulate and access an RFID tag, such as tag 110-K, from among a smaller group of tags based on predetermined criteria.

In one embodiment, the criteria may be a flag being set by the tag in response to a comparison of a mask value received from the reader with sensor data stored at a mask address.

Figure 3:
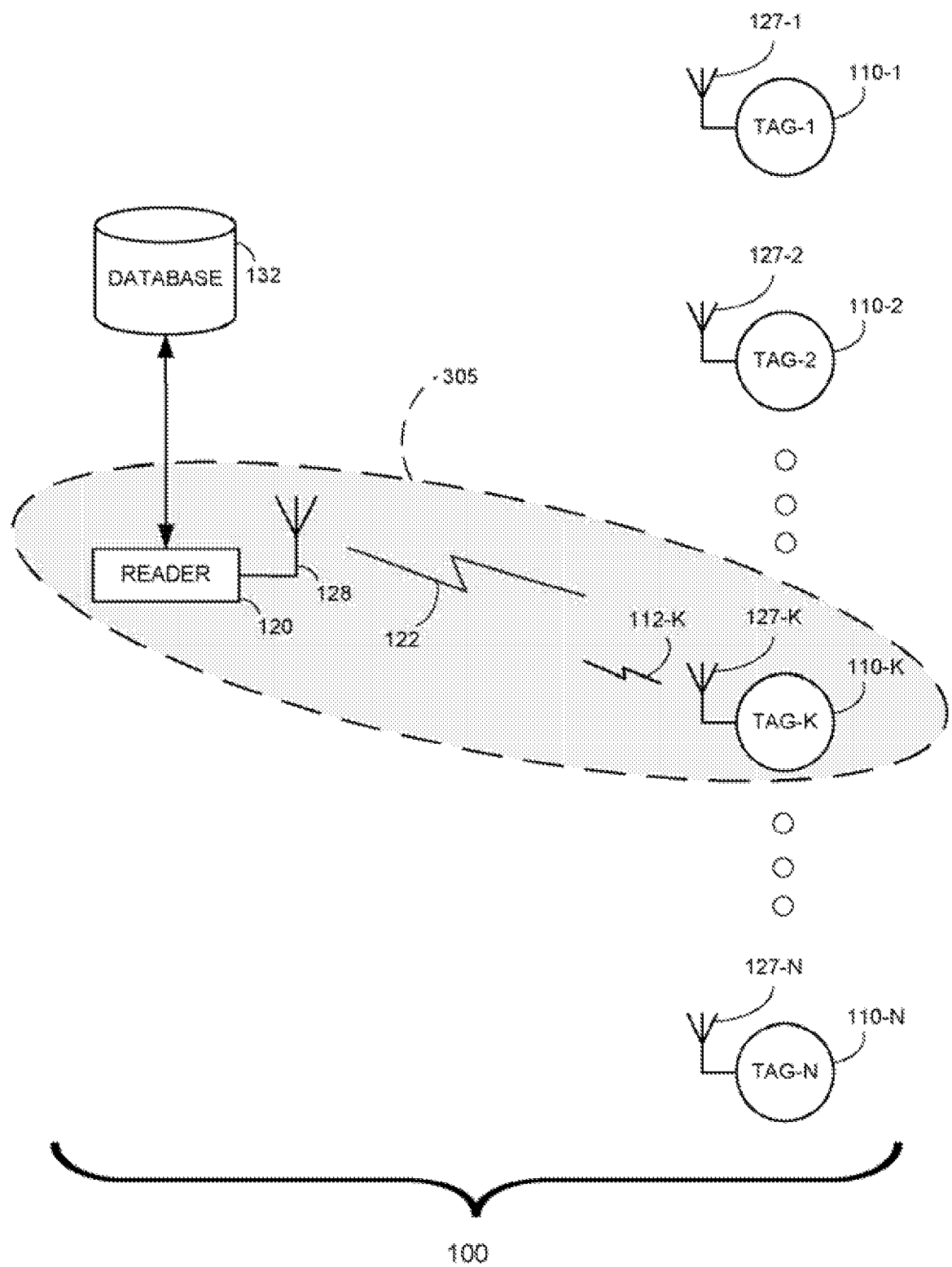
FIG. 3 is a diagram of the RFID system of FIG. 1 with the RFID reader accessing (e.g. writing to) a singulated tag.

FIG. 3 is a diagram of the RFID system of FIG. 1 with the RFID reader accessing (e.g. writing to) a singulated tag. In addition to the system 100 of FIG. 1, RFID tag 110-K has been singulated by reader 120, as shown by relationship 305. This singulation has caused all tags 110-X except tag 110-K to not transmit, so that reader 120 and singulated tag 110-K can exchange data without interference and reader 120 can access tag 110-K.

Reader 120 has accomplished singulation by first issuing appropriate commands, which have caused tags 110-X to transition to appropriate internal states. In this example, at least tag 110-K is in a state where it can receive an access-type command, while the remaining tags are in states where generally they do not respond or take action, until reader 120 and singulated tag 110-K complete their exchanges.

The term singulation, as used for the present document, generally means a process for distinguishing a tag from other tags. As such, singulation may be unnecessary when a single reader is addressing a single tag, or where there is no interference from, or concern about any other RFID components such as other RFID tags. The term singulation, as used here, may by coincidence be functionally the same as a specific term "singulation", which means a process of a reader that can be performed with many or even a single tag.

The term accessing, as used for the present document, generally means a process for retrieving information stored at the tag and/or causing information stored at the tag to be modified. This may include receiving an identifier symbol, user-specified data, and the like, from the tag, as well as storing a new identifier symbol etc. at the tag. Accessing may further include causing one or more operational parameters of the tag to be changed such as a security mechanism.

The components of the RFID system of FIG. 1 through 3 may communicate with each other in any number of modes. One such mode is called full duplex. Another such mode is called half-duplex, and is described below.

Figure 4:
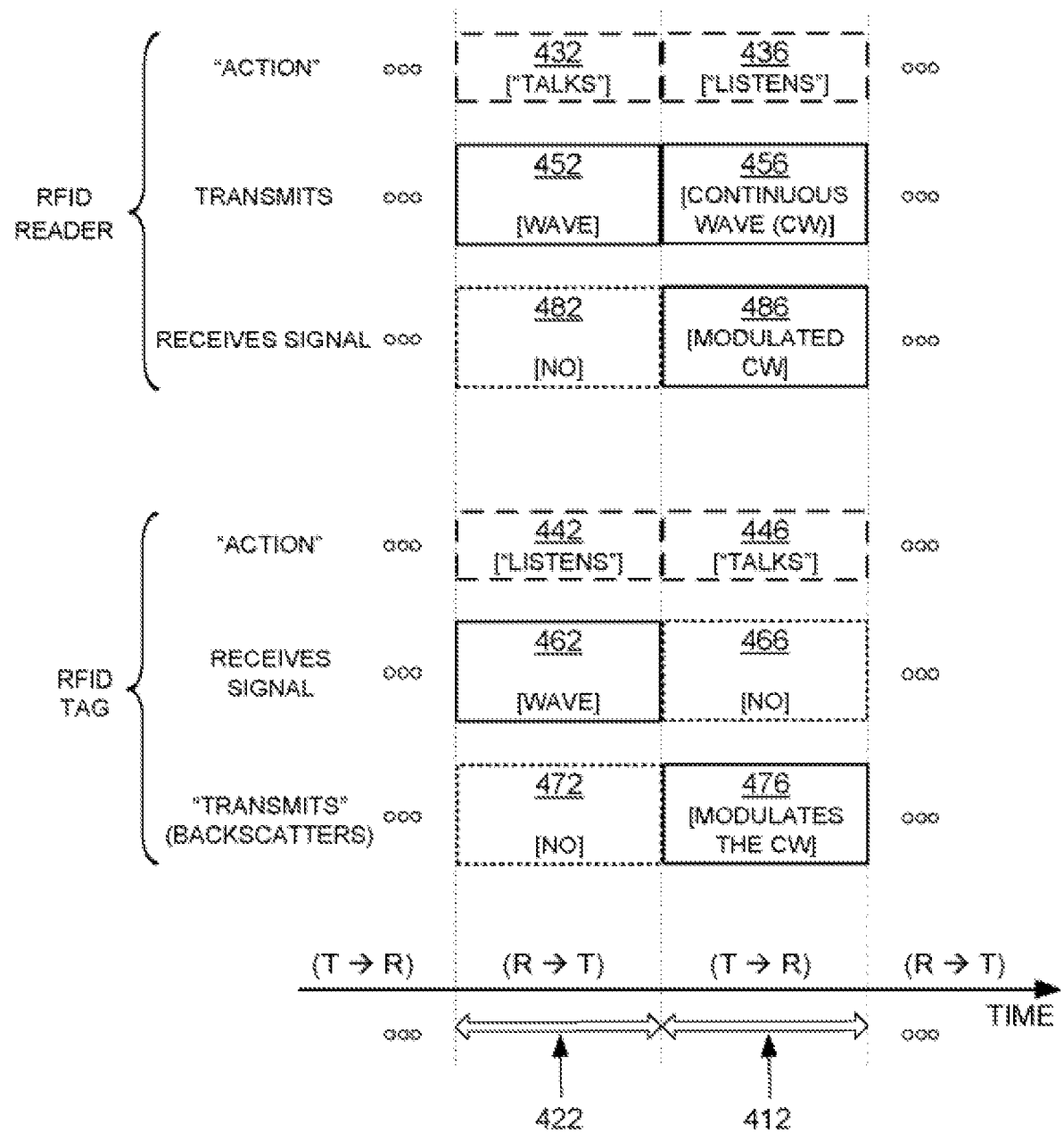
FIG. 4 is a conceptual diagram for explaining a half-duplex mode of communication between the components of the RFID system of FIG. 1.

FIG. 4 is a conceptual diagram 400 for explaining the half-duplex mode of communication between the components of the RFID system of FIG. 1, especially when a tag 110-X (representing one of the plurality of tags in FIG. 1) is implemented as a passive tag. The explanation is made with reference to a TIME axis, and also to a human metaphor of "talking" and "listening". The actual technical implementations for "talking" and "listening" are now described.

RFID reader 120 and RFID tag 110-X talk and listen to each other by taking turns. As seen on axis TIME, when reader 120 talks to tag 110X the communication session is designated as "R→T", and when tag 110-X talks to reader 120 the communication session is designated as "T→R". Along the TIME axis, a sample R→T communication session occurs during a time interval 422, and a following sample T→R communication session occurs during a time interval 412. Of course interval 422 is typically of a different duration than interval 412—here the durations are shown approximately equal only for purposes of illustration.

According to blocks 432 and 436, RFID reader 120 talks during interval 422, and listens during interval 412. According to blocks 442 and 446, RFID tag 110-X listens while reader 120 talks (during interval 422), and talks while reader 120 listens (during interval 412).

In terms of actual technical behavior, during interval 422, reader 120 talks to tag 110-X as follows. According to block 452, reader 120 transmits wave 122, which was first described in FIG. 1. At the same time, according to block 462, tag 110-X receives wave 122 and processes it, to extract data and so on. Meanwhile, according to block 472, tag 110-X does not backscatter with its antenna, and according to block 482, reader 120 has no wave to receive from tag 110-X.

During interval 412, tag 110-X talks to reader 120 as follows. According to block 456, reader 120 transmits a Continuous Wave (CW), which can be thought of as a carrier signal that ideally encodes no information. As discussed before, this carrier signal serves both to be harvested by tag 110-X for its own internal power needs, and also as a wave that tag 110-X can backscatter. Indeed, during interval 412, according to block 466, tag 110-X does not receive a signal for processing. Instead, according to block 476, tag 110-X modulates the CW emitted according to block 456, so as to generate backscatter wave 112. Concurrently, according to block 486, reader 120 receives backscatter wave 112 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPC global, which is an organization that maintains a website at: <http://www.epcglobalinc.org/> at the time this document is initially filed with the USPTO.

It was described above how reader 120 and tag 110-X communicate in terms of time. In addition, communications between reader 120 and tag 110-X may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 120 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 110-X can respond with a backscatter that is modulated directly on the frequency of the reader's emitted CW, also called baseband backscatter. Alternatively, Tag 110-X can respond with a backscatter that is modulated onto a frequency, developed by Tag 110-X that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 5:
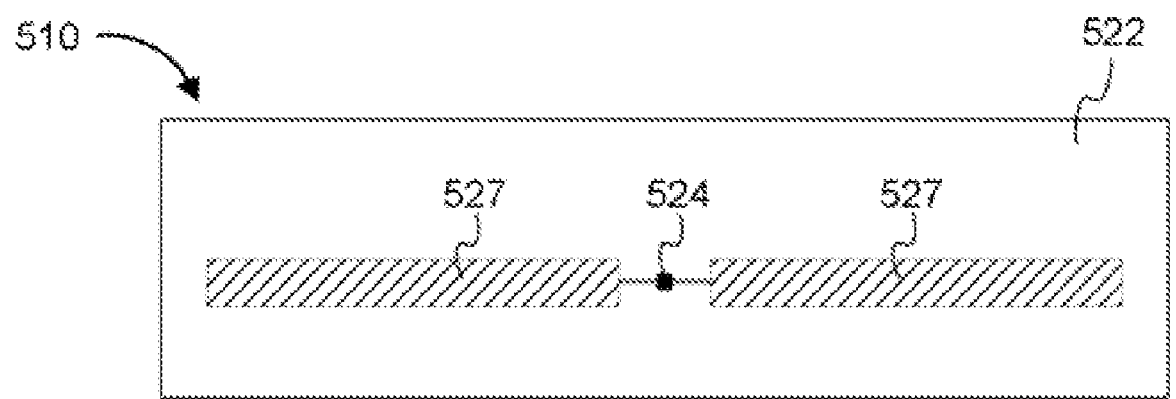
FIG. 5 is a diagram showing components of a passive RFID tag, such as a tag that can be used in the system of FIG. 1.

FIG. 5 is a diagram of an RFID tag 510, which can be the same as tag 110-X of FIG. 1. Tag 510 is implemented as a passive tag, meaning it does not have its own power source. Much of what is described in this document, however, applies also to active tags.

Tag 510 is formed on a substantially planar inlay 522, which can be made in many ways known in the art. Tag 510 includes an electrical circuit, which is preferably implemented in an integrated circuit (IC) 524. IC 524 is arranged on inlay 522.

Tag 510 also includes an antenna for exchanging wireless signals with its environment. The antenna is usually flat and attached to inlay 522. IC 524 is electrically coupled to the antenna via suitable antenna ports (not shown in FIG. 5).

The antenna may be made in a number of ways, as is well known in the art. In the example of FIG. 5, the antenna is made from two distinct antenna segments 527, which are shown here forming a dipole. Many other embodiments are possible, using any number of antenna segments.

In some embodiments, an antenna can be made with even a single segment. Different places of the segment can be coupled to one or more of the antenna ports of IC 524. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 524. IC 524 both harvests power, and responds if appropriate, based on the incoming signal and its internal state. In order to respond by replying, IC 524 modulates the reflectance of the antenna, which generates the backscatter from a wave transmitted by the reader. Coupling together and uncoupling the antenna ports of IC 524 can modulate the reflectance, as can a variety of other means.

In the embodiment of FIG. 5, antenna segments 527 are separate from IC 524. In other embodiments, antenna segments may alternately be formed on IC 524, and so on.

Figure 6:
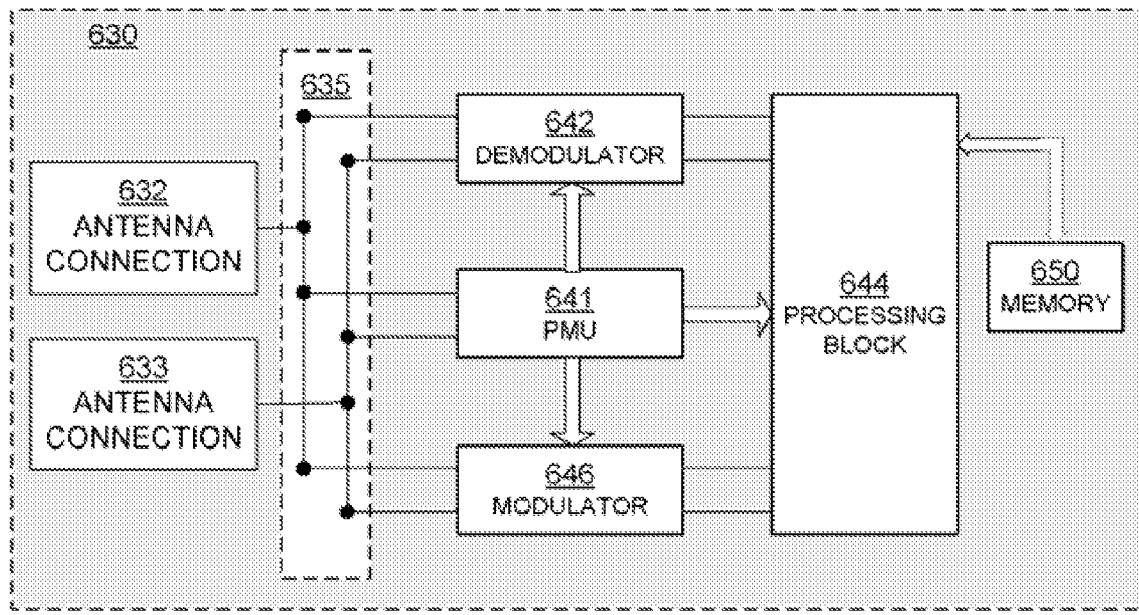
FIG. 6 is a block diagram of an implementation of an electrical circuit formed in an IC of the tag of FIG. 5.

FIG. 6 is a block diagram of an implementation of an electrical circuit formed in an IC of the tag of FIG. 5. Circuit 630 has a number of main components that are described in this document. Circuit 630 may have a number of additional components from what is shown and described, or different components, depending on the exact implementation.

Circuit 630 includes at least two antenna connections 632, 633, which are suitable for coupling to one or more antenna segments (not shown in FIG. 6). Antenna connections 632, 633 may be made in any suitable way, such as pads and so on. In a number of embodiments more than two antenna connections are used, especially in embodiments where more antenna segments are used.

Circuit 630 includes a section 635. Section 635 may be implemented as shown, for example as a group of nodes for proper routing of signals. In some embodiments, section 635 may be implemented otherwise, for example to include a receive/transmit switch that can route a signal, and so on.

Circuit 630 also includes a Power Management Unit (PMU) 641. PMU 641 may be implemented in any way known in the art, for harvesting raw RF power received via antenna connections 632, 633. In some embodiments, PMU 641 includes at least one rectifier, and so on.

In operation, an RF wave received via antenna connections 632, 633 is received by PMU 641, which in turn generates power for components of circuit 630. This is true for either or both R→T and T→R sessions, whether or not the received RF wave is modulated.

Circuit 630 additionally includes a demodulator 642. Demodulator 642 demodulates an RF signal received via antenna connections 632, 633. Demodulator 642 may be implemented in any way known in the art, for example including an attenuator stage, amplifier stage, and so on.

Circuit 630 further includes a processing block 644. Processing block 644 receives the demodulated signal from demodulator 642, and may perform operations. In addition, it may generate an output signal for transmission.

Processing block 644 may be implemented in any way known in the art. For example, processing block 644 may include a number of components, such as a processor, a memory, a decoder, an encoder, and so on.

Circuit 630 additionally includes a modulator 646. Modulator 646 modulates an output signal generated by processing block 644. The modulated signal is transmitted by driving antenna connections 632, 633, and therefore driving the load presented by the coupled antenna segment or segments. Modulator 646 may be implemented in any way known in the art, for example including a driver stage, amplifier stage, and so on.

In one embodiment, demodulator 642 and modulator 646 may be combined in a single transceiver circuit. In another embodiment, modulator 646 may include a backscatter transmitter or an active transmitter. In yet other embodiments, demodulator 642 and modulator 646 are part of processing block 644.

Circuit 630 additionally includes a memory 650, which stores information. Memory 650 is preferably implemented as a Non Volatile Memory (NVM), which means that its stored information is retained, even when circuit 630 does not have power, as is frequently the case for a passive RFID tag.

It will be recognized at this juncture that the shown components of circuit 630 can also be those of a circuit of an RFID reader according to the invention, without needing PMU 641. Indeed, an RFID reader can typically be powered differently, such as from a wall outlet, a battery, and so on. Additionally, when circuit 630 is configured as a reader, processing block 644 may have additional Inputs/Outputs (I/O) to a terminal, network, or other such devices or connections.

In terms of processing a signal, circuit 630 operates differently during a R→T session and a T→R session, in treating a signal. The different operations are described below.

Figures 7A, 7B:
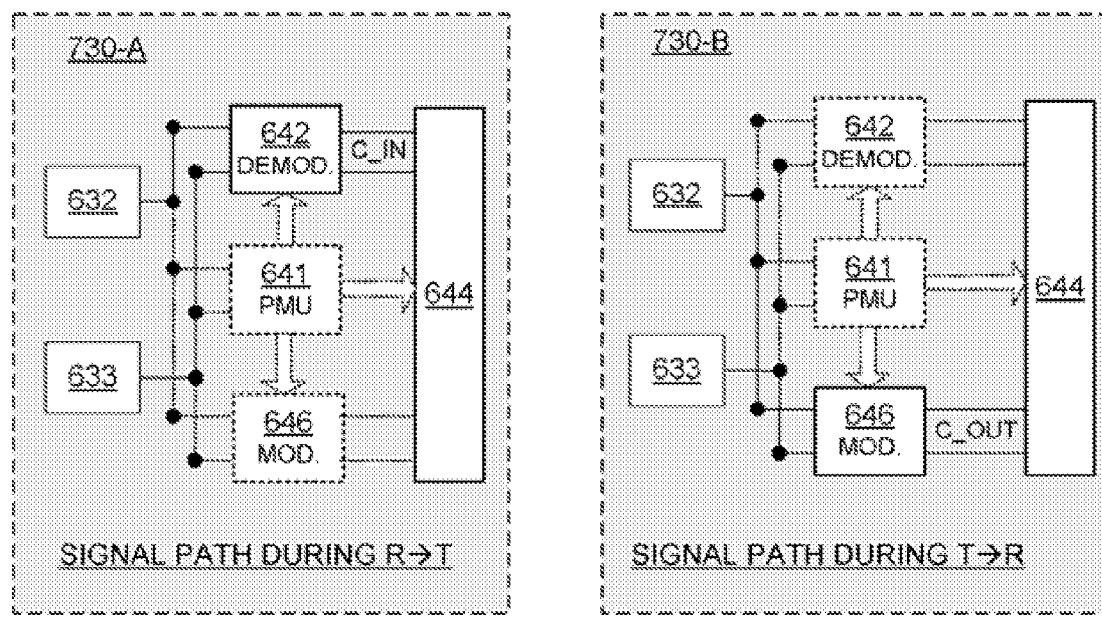
FIG. 7A is the block diagram of FIG. 6, modified to emphasize a signal operation during a R→T session of FIG. 4.
FIG. 7B is the block diagram of FIG. 6, modified to emphasize a signal operation during a T→R session of FIG. 4.

FIG. 7A is the block diagram of FIG. 6, modified to emphasize a signal operation during a R→T session (receive mode of operation) of FIG. 4. An RF wave is received from antenna connections 632, 633, then a signal is demodulated from demodulator 642, and then input to processing block 644 as C_IN. In one embodiment according to the present invention, C_IN may include a received stream of symbols.

Version 730-A shows as relatively obscured those components that do not play a part in processing a signal during a R→T session. Indeed, PMU 641 may be active, but only in converting raw RF power. And modulator 646 generally does not transmit during a R→T session. Modulator 646 typically does not interact with the received RF wave significantly, either because switching action in section 635 of FIG. 6 decouples the modulator 646 from the RF wave, or by designing modulator 646 to have a suitable impedance, and so on.

While modulator 646 is typically inactive during a R→T session, it need not be always the case. For example, during a R→T session, modulator 646 could be active in other ways. For example, it could be adjusting its own parameters for operation in a future session.

FIG. 7B is the block diagram of FIG. 6, modified to emphasize a signal operation during a T→R session of FIG. 4. A signal is output from processing block 644 as C_OUT. In one embodiment according to the present invention, C_OUT may include a transmission stream of symbols. C_OUT is then modulated by modulator 646, and output as an RF wave via antenna connections 632, 633.

Version 730-B shows as relatively obscured those components that do not play a part in processing a signal during a T→R session. Indeed, PMU 641 may be active, but only in converting raw RF power. And demodulator 642 generally does not receive during a T→R session. Demodulator 642 typically does not interact with the transmitted RF wave, either because switching action in section 635 decouples the demodulator 642 from the RF wave, or by designing demodulator 642 to have a suitable impedance, and so on.

While demodulator 642 is typically inactive during a T→R session, it need not be always the case. For example, during a T→R session, demodulator 642 could be active in other ways. For example, it could be adjusting its own parameters for operation in a future session.

Figure 8:
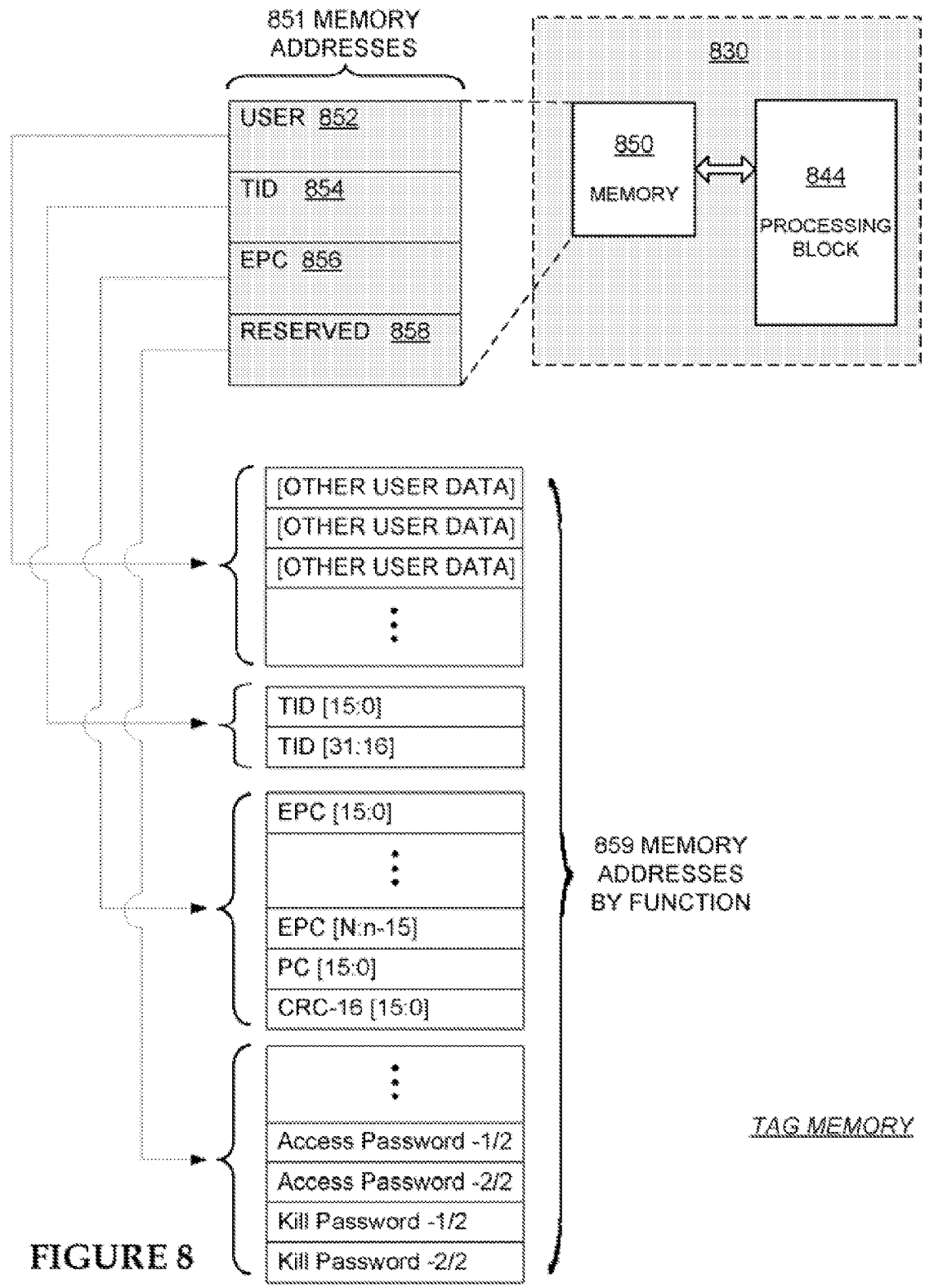
FIG. 8 is a diagram of an RFID tag's memory according to function or physical addresses.

FIG. 8 is a diagram of an RFID tag's memory according to function or physical addresses.

As shown in FIG. 8, the data stored in tag memory 850 may include identification information associated with tag 110-X, information associated with an item the tag is attached to, communication parameters such as a password, externally delivered data, and the like. Data may be stored in tag memory 850 during a production stage, or during operation. A tag processing block 844 may access tag memory 850 to store or retrieve one or more of a received command, password, and externally delivered data. The processing block 844 may also access tag memory 850 to change its contents based on a command received from reader 120.

Memory addresses 851 of tag memory 850 may be partitioned into user-specific portion 852, tag-identification portion 854, object-identification portion (EPC) 856, and reserved portion 858. In other embodiments, tag memory 850 may be partitioned in other ways with fewer or more portions, or not partitioned at all.

User-specific portion 852 may be employed to store user-specified information including sensor data if the tag is associated with a sensor whose data is mapped to user memory. Tag-identification portion (TID) 854 may be employed to store information associated with a tag identifier.

Object identification portion (EPC) memory 856 can be arranged to store, as convenient, a protocol control (PC) parameter, an EPC code, and/or a CRC 16 (cyclic redundancy check) as shown in tag memory addresses by function 859. EPC memory may also contain sensor data if the sensor data is mapped into EPC memory.

Reserved memory portion 858 may be used to store system parameters such as passwords. Tag memory addresses by function 859 illustrate two such example parameters, an access command password and a kill command password. Reserved memory may also contain sensor data if the tag is associated with a sensor whose data is mapped into reserved memory.

Any portion of memory may store data in a single group, such as a single byte or word, or may store data in multiple groups or words (multiple bytes).

Some of the embodiments are now described. According to one embodiment, a method for an RFID tag includes receiving a command associated with a tag operation from an RFID reader, determining, responsive to the received command, whether a power adequacy condition is met for performing the tag operation, and if so, performing the tag operation in response to the received command, else not performing the tag operation.

The method further includes transmitting a non-compliance response if the power adequacy condition is not met, and setting a flag or changing a state of the tag if the power adequacy condition is not met. If the power adequacy condition is not met, an alternate tag operation may also be performed in response to the received command.

According to other embodiments, determining whether the power adequacy condition is met may include entering a test mode, activating at least a first tag circuit, and determining the power consumption attributable to activating the first tag circuit during the test mode. The tag operation may call for operating the first tag circuit or a circuit other than the first tag circuit.

According to further embodiments, the power consumption may be determined by comparing the available power to a power adequacy threshold. The power adequacy threshold may be stored in a tag memory and set in response to a received command or based on an internal state of the tag.

According to yet other embodiments, the method may include activating a second tag circuit during the test mode, in which the measured power consumption is due also to activating the second tag circuit during the test mode. The second tag circuit may include one or more subcircuits. The first and the second tag circuits may be activated simultaneously or sequentially in predetermined intervals. If the circuits are activated sequentially, the sequential activation may be terminated when the available power in the tag is less than the predetermined threshold.

According to yet further embodiments, the received command may be a WRITE command, and a NON-WRITE error response may be transmitted to the RFID reader. The first and second tag circuits may include at least one of a memory regulator, a memory charge pump, a voltage doubler, or a memory core. The error response may also be a "Willing To Try Again".

According to some embodiments, the received command may be an access command associated with a sensor on the tag, and the tag operation may include at least one of reading the sensor, activating the sensor, calibrating the sensor, or receiving status information from the sensor. The first and second tag circuits may include at least one of the sensor, a tag memory, a random number generator, a demodulator, or an oscillator.

Another method for an RFID tag according to embodiments may include determining whether a power adequacy condition is met for performing a tag operation associated with a reader command, receiving a command associated with the tag operation from an RFID reader, and transmitting a non-compliance response to the reader if the power adequacy condition is not met, else performing the tag operation in response to the received command.

The determination of whether the power adequacy condition is met may be performed continuously or at predetermined intervals by the tag. The tag may be powered from an unmodulated carrier wave transmitted by the reader or by a power source associated with the tag.

Similar to the previous methods, determining whether the power adequacy condition is met may include entering a test mode, activating at least a first tag circuit, and determining a power consumption attributable to activating the first tag circuit during the test mode. The power consumption may be determined by comparing the available power to a power adequacy threshold, where the power adequacy threshold is set in response to a previously received command or based on an internal state of the tag.

The method may further include activating a second tag circuit during the test mode, where the measured power consumption is due also to activating the second tag circuit during the test mode. The first and the second tag circuits may be activated simultaneously or sequentially in predetermined intervals.

Some are methods according to embodiment are of operation of an RFID tag. Others are methods for controlling an RFID tag.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Methods are now described more particularly according to embodiments.

Figure 9A:
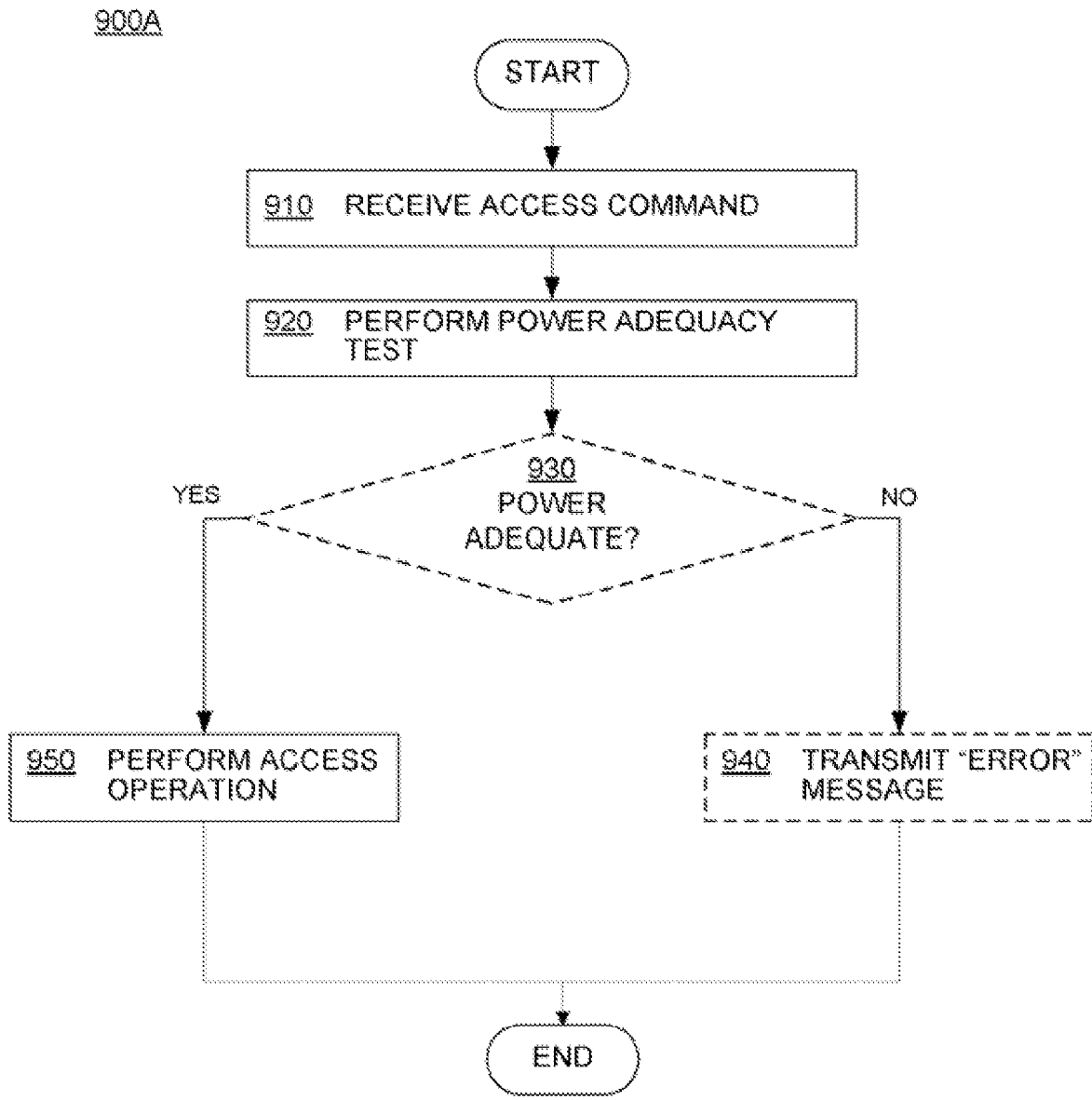
FIG. 9A is a flowchart of a process for using power adequacy check in an RFID tag according to some embodiments.

FIG. 9A is a flowchart of a process for using power adequacy check in an RFID tag according to some embodiments.

Process 900A begins at operation 910, where an access command, such as a WRITE command, is received from a reader that requires a memory of the tag, such as an NVM memory, to be accessed.

According to a next operation 920, power adequacy test is performed. The power adequacy test may include measuring a power level available to the tag for the access operation, monitoring tag power while selected circuits are turned on sequentially, and the like.

According to a next optional decision operation 930, a determination is made whether the available power level is adequate. If the power level is not adequate the tag may abort the access operation and send an error message (e.g. a "WILLING TO TRY AGAIN" message), according to a next optional operation 940.

If the power level is adequate, the access operation may be performed as requested by the reader according to next operation 950.

Figure 9B:
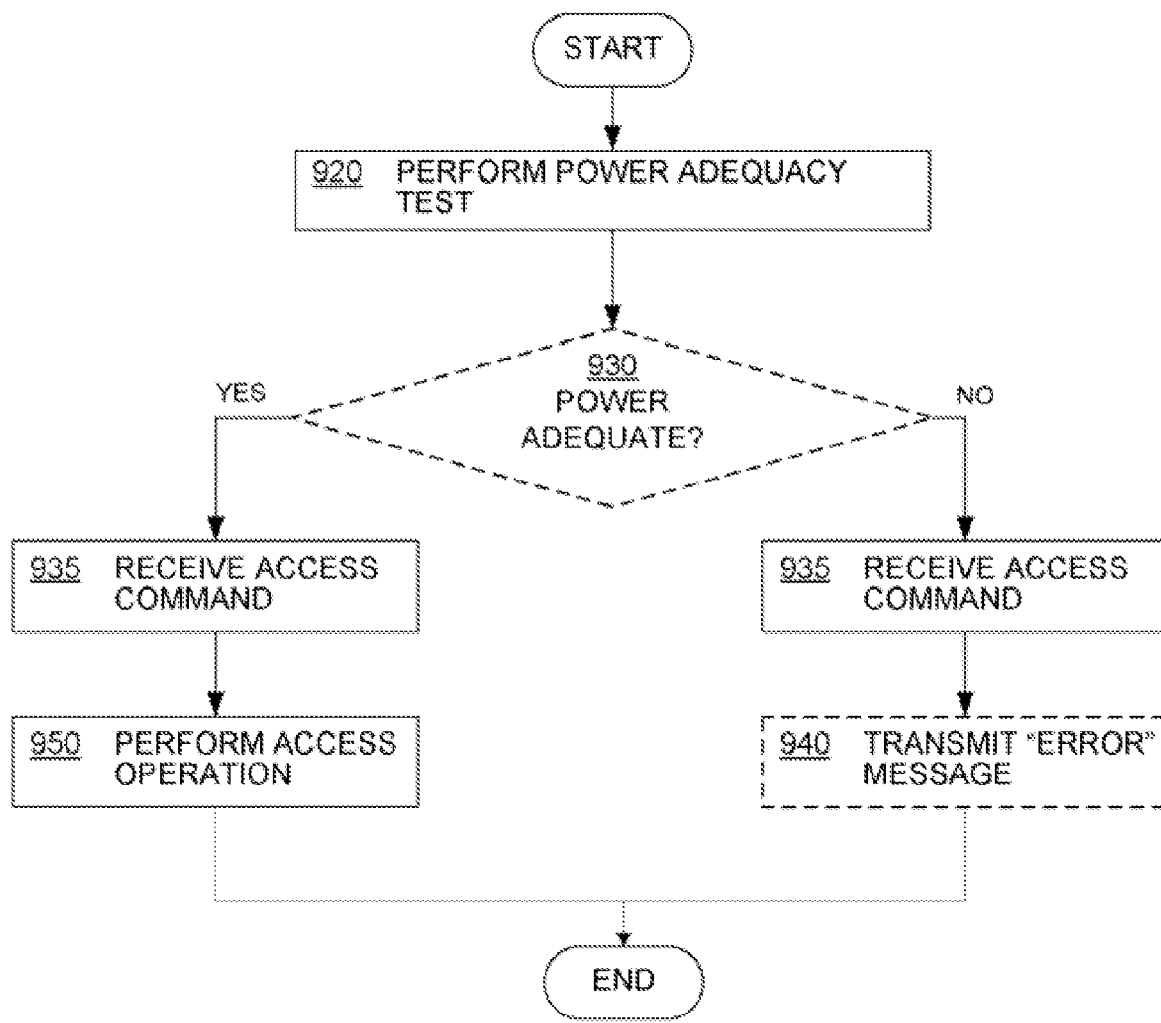
FIG. 9B is a flowchart of a process for using power adequacy check in an RFID tag according to other embodiments.

FIG. 9B is a flowchart of a process for using power adequacy check in an RFID tag according to other embodiments.

Process 900B begins at operation 920, where power adequacy test is performed as described above.

According to a next optional decision operation 930, a determination is made whether the available power level is adequate.

Following the optional decision operation, an access command, such as a WRITE command, is received from a reader that requires a memory of the tag, such as an NVM memory, to be accessed in operation(s) 935.

If access command is received following an affirmative determination that power is adequate, the access operation may be performed as requested by the reader according to next operation 950.

If access command is received following a negative determination that power is not adequate, the tag may abort the access operation and send an error message (e.g. a "WILLING TO TRY AGAIN" message), according to a next optical operation 940.

The operations included in processes 900A and 900B are for illustration purposes. Performing an access operation in an RFID tag based on a power adequacy test may be implemented by similar processes with fewer or additional steps, as well as in different order of operations using the principles described herein.

Figure 10A:
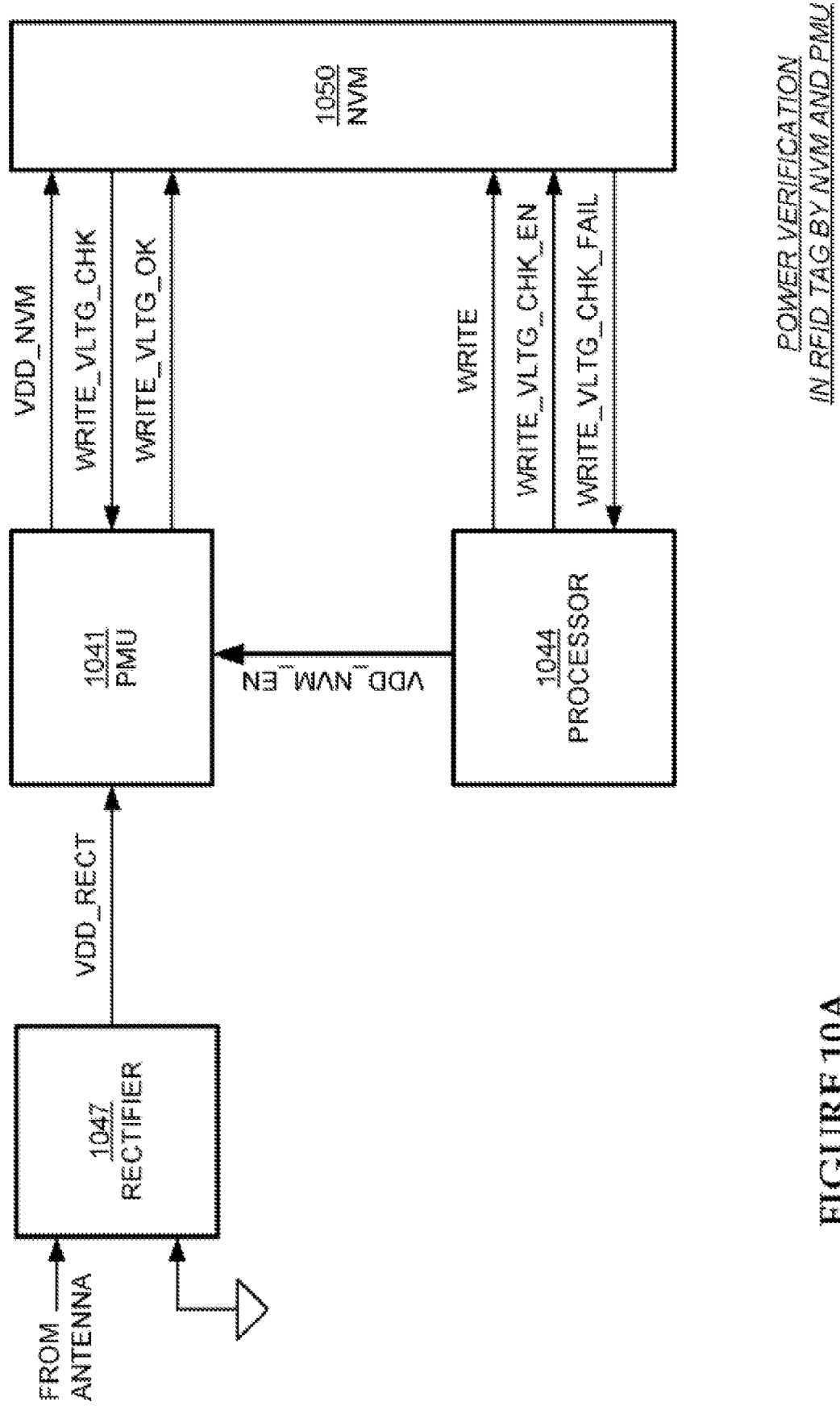
FIG. 10A is a block diagram of select RFID tag components illustrating use of power verification by a combination of a PMU and an NVM in a tag prior to WRITE operations according to embodiments.

FIG. 10A is a block diagram of select RFID tag components illustrating use of power verification by a combination of a PMU and an NVM in a tag prior to WRITE operations according to embodiments.

As described previously, a rectifier as part of the PMU may rectify received RF signal to generate power for the tag. The rectifier may also be outside the PMU block. In FIG. 10A, rectifier 1047 receives a carrier wave from a reader through one or more antennas and provides supply voltage VDD_RECT to PMU 1041 by rectifying the received signal.

According to some embodiments, a pretest of available power level for the requested operation by the reader is performed by a combination of PMU 1041 and tag memory NVM 1050, coordinated by processor 1044.

PMU 1041 provides supply voltage VDD_NVM to NVM 1050. Power level test and response signals WRITE_VLTG_CHK and WRITE_VLTG_OK may be exchanged between the PMU 1041 and NVM 1050 to confirm that the requested operation (in this example: WRITE operation) may be performed with the available power in the tag.

Processor 1044 may also exchange WRITE_VLTG_CHK_EN and WRITE_VLTG_CHK_FAIL signals with NVM 1050 to confirm whether the WRITE operation will fail due to lack of sufficient power. If the power level is adequate, processor 1044 may perform the WRITE operation storing requested information in NVM 1050. Moreover, processor 1044 may control activation of NVM 1050 by enabling PMU 1041 to provide the supply voltage using VDD_NVM_EN signal.

Figure 10B:
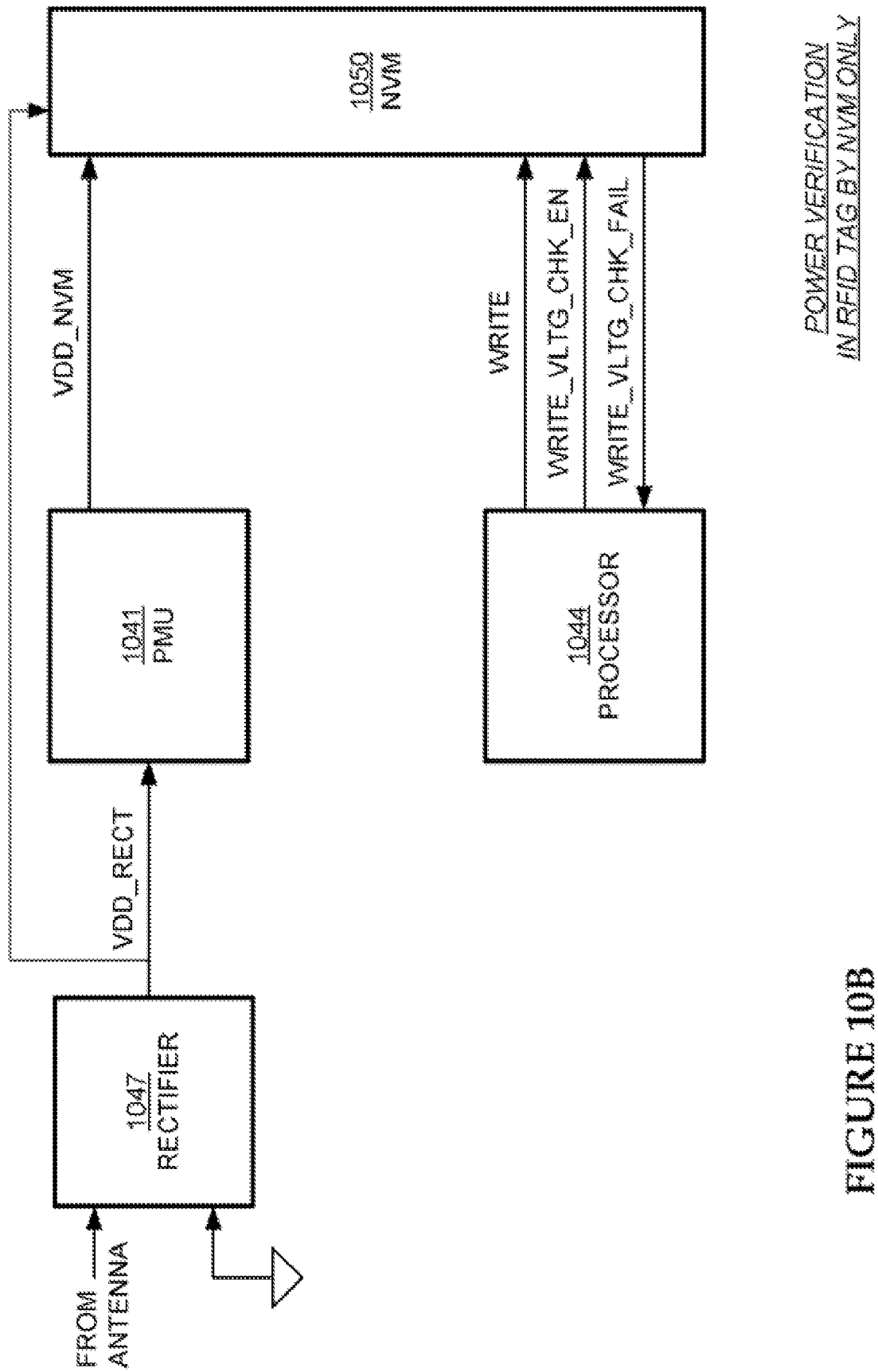
FIG. 10B is a block diagram of select RFID tag components illustrating use of power verification by an NVM only in a tag prior to WRITE operations according to embodiments.

FIG. 10B is a block diagram of select RFID tag components illustrating use of power verification by an NVM only in a tag prior to WRITE operations according to embodiments.

Rectifier 1047, PMU 1041, NVM 1050, and processor 1044 in FIG. 10B are arranged to operate similarly to the likewise numbered components in FIG. 10A. Differently from the circuit is FIG. 10A, however, the power verification pretest is performed by NVM 1050 in this case.

PMU 1041 may still provide the supply voltage VDD_NVM to NVM 1050. In an alternative embodiment, the supply voltage may be provided directly by rectifier 1047.

Processor 1044 and NVM 1050 exchange WRITE_VLTG_CHK_EN and WRITE_VLTG_CHK_FAIL signals to confirm whether the WRITE operation will fail due to lack of sufficient power. If the power level is adequate, processor 1044 may perform the WRITE operation storing requested information in NVM 1050.

Figure 10C:
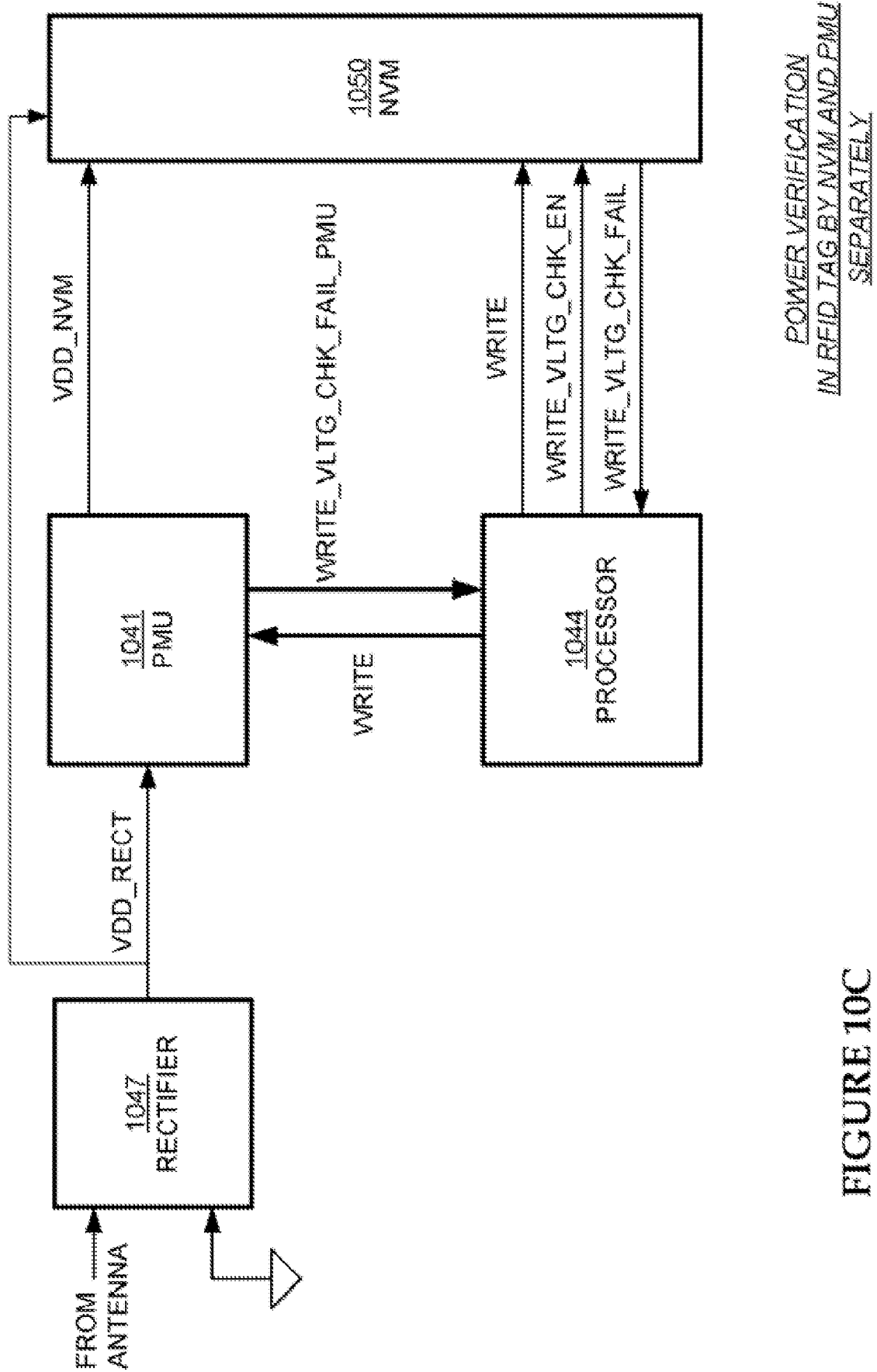
FIG. 10C is a block diagram of select RFID tag components illustrating use of power verification by a PMU and an NVM separately in a tag prior to WRITE operations according to embodiments.

FIG. 10C is a block diagram of select RFID tag components illustrating use of power verification by a PMU and an NVM separately in a tag prior to WRITE operations according to embodiments.

In the tag configuration of FIG. 10C, processor 1044 and NVM 1050 exchange WRITE_VLTG_CHK_EN and WRITE_VLTG_CHK_FAIL signals to confirm whether the WRITE operation will fail due to lack of sufficient power. If the power level is adequate, processor 1044 may perform the WRITE operation storing requested information in NVM 1050.

In addition, PMU 1041 also checks whether the tag has sufficient power to complete the WRITE operation. PMU 1041 notifies processor 1044 using WRITE_VLTG_CHK_FAIL_PMU, if the operation cannot be completed due to lack of adequate power.

Processor 1044 evaluates both responses and enables the WRITE operation with the WRITE command sent to NVM 1050. The WRITE signal may also be sent to PMU 1041.

Figure 11A:
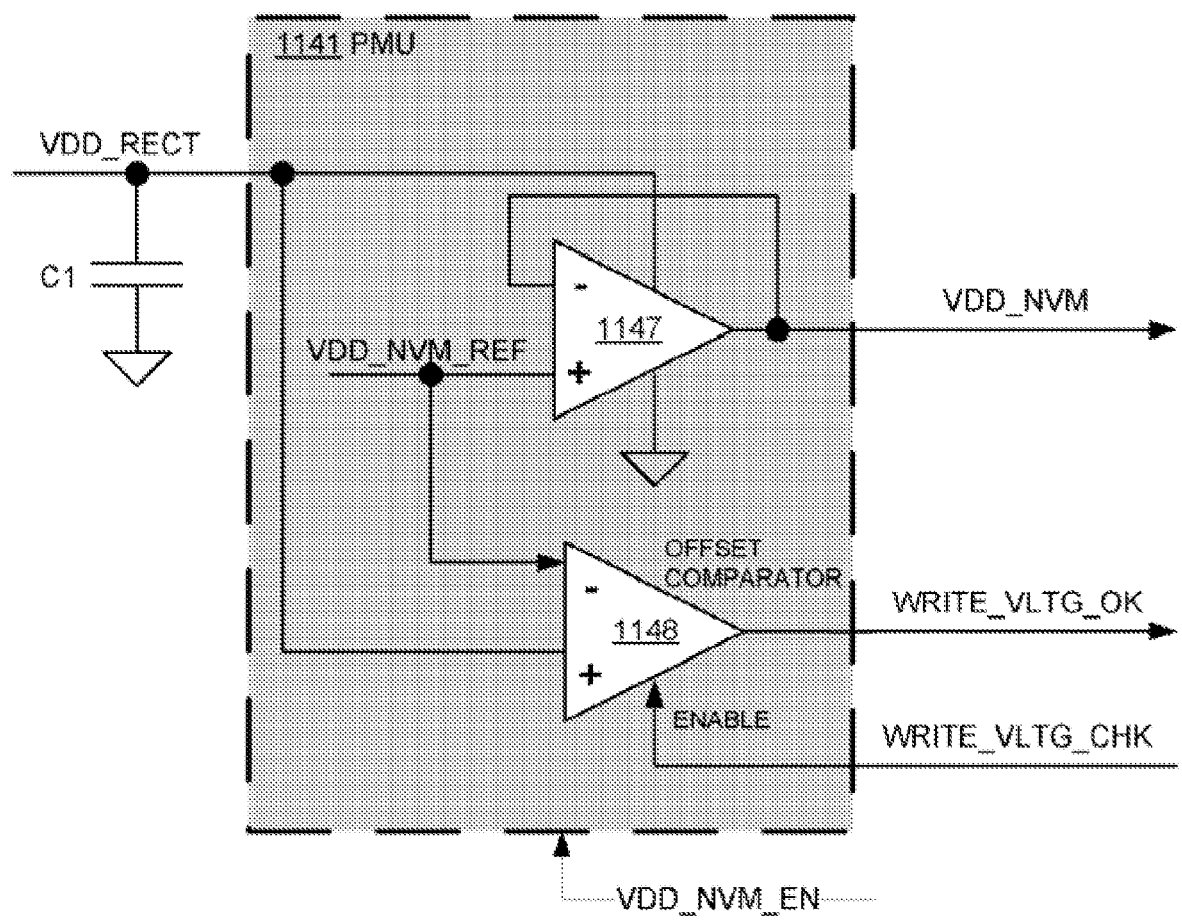
FIG. 11A is a schematic diagram of a Power Management Unit of an RFID tag configured to use power verification before WRITE operations according to embodiments.

FIG. 11A is a schematic diagram of a Power Management Unit of an RFID tag configured to use power verification before WRITE operations according to embodiments.

PMU 1141 is shown with a basic configuration that includes two relevant components: amplifier 1147 and offset comparator 1148. In other embodiments, PMU 1141 may be implemented with fewer or more components.

In an operation, PMU 1141 receives rectified supply voltage VDD_RECT from a rectifier of the tag. Amplifier 1147 provides memory supply voltage VDD_NVM based on a reference memory voltage VDD_NVM_REF and VDD_RECT.

Offset comparator 1148 uses a comparison between VDD_NVM_REF and VDD_RECT to provide power verification signal WRITE_VLTG_OK indicating there is sufficient power to complete the WRITE operation. VDD_NVM_REF may be a threshold voltage set by a received command or based on an internal tag state. In practical applications, the condition for offset comparator 1148 to trip may be VDD_RECT being higher than VDD_NVM_REF by a set offset amount such as 100 mV.

An operation of offset comparator 1148 may be enabled by the tag processor through WRITE_VLTG_CHK.

Figure 11B:
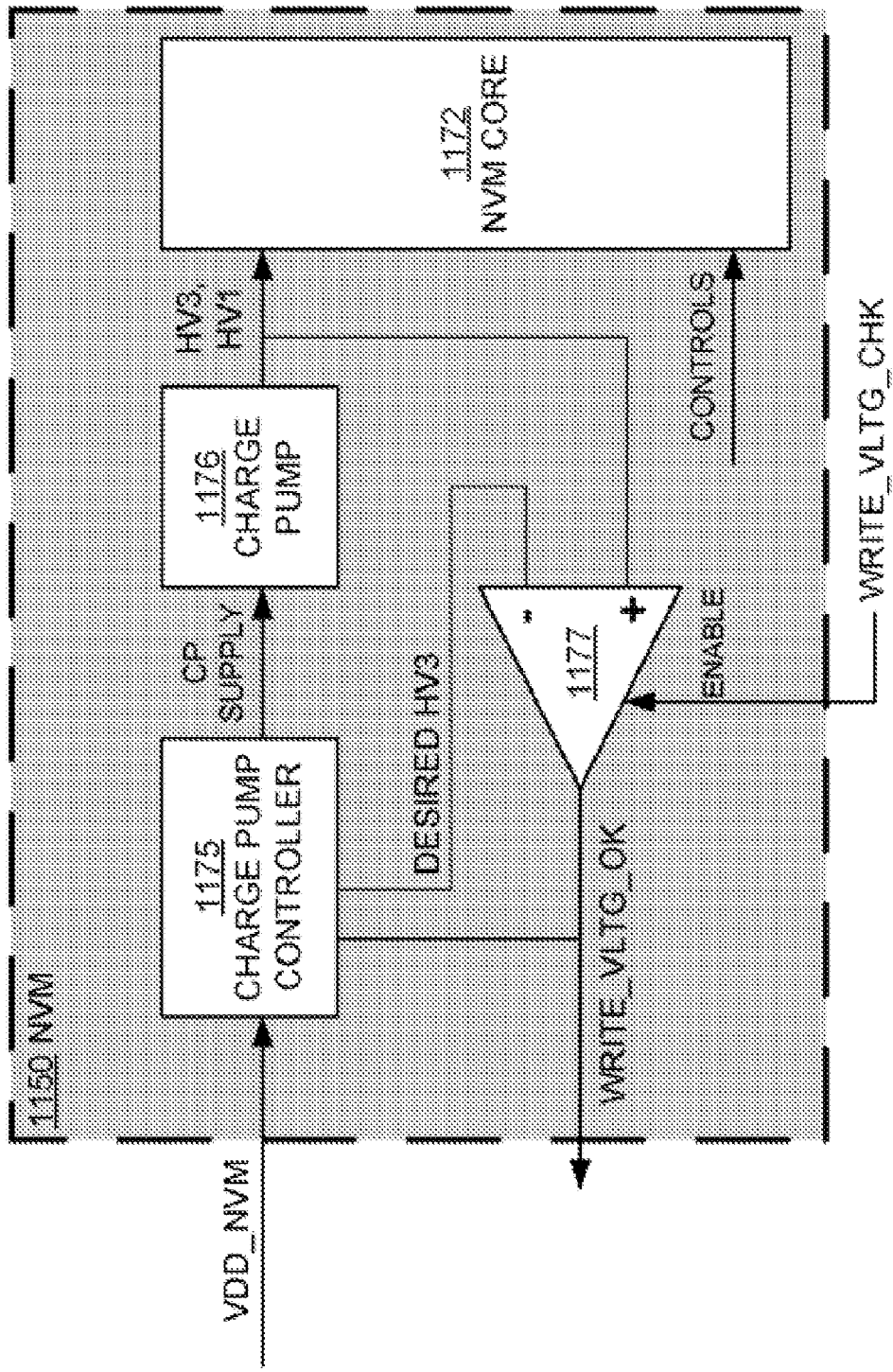
FIG. 11B is a schematic diagram of a Non-Volatile Memory block of an RFID tag configured to use power verification before WRITE operations using a comparator according to embodiments.

FIG. 11B is a schematic diagram of a Non-Volatile Memory block of an RFID tag configured to use power verification before WRITE operations using a comparator according to embodiments.

NVM 1150 may include a number of standard components such as charge pump controller 1175, charge pump 1176, and NVM core 1172. When tasked with performing the power verification test, NVM 1150 may also include comparator 1177 that is arranged to provide power verification signal WRITE_VLTG_OK indicating there is sufficient power to complete the WRITE operation based on a comparison of desired high voltage H3 for the memory core and the actual high voltage H3 provided to the memory core. High voltage H3 is used to store information in memory cells of the NVM core 1172.

As in FIG. 11A, an operation of comparator 1177 may be enabled by the tag processor through WRITE_VLTG_CHK.

Figure 11C:
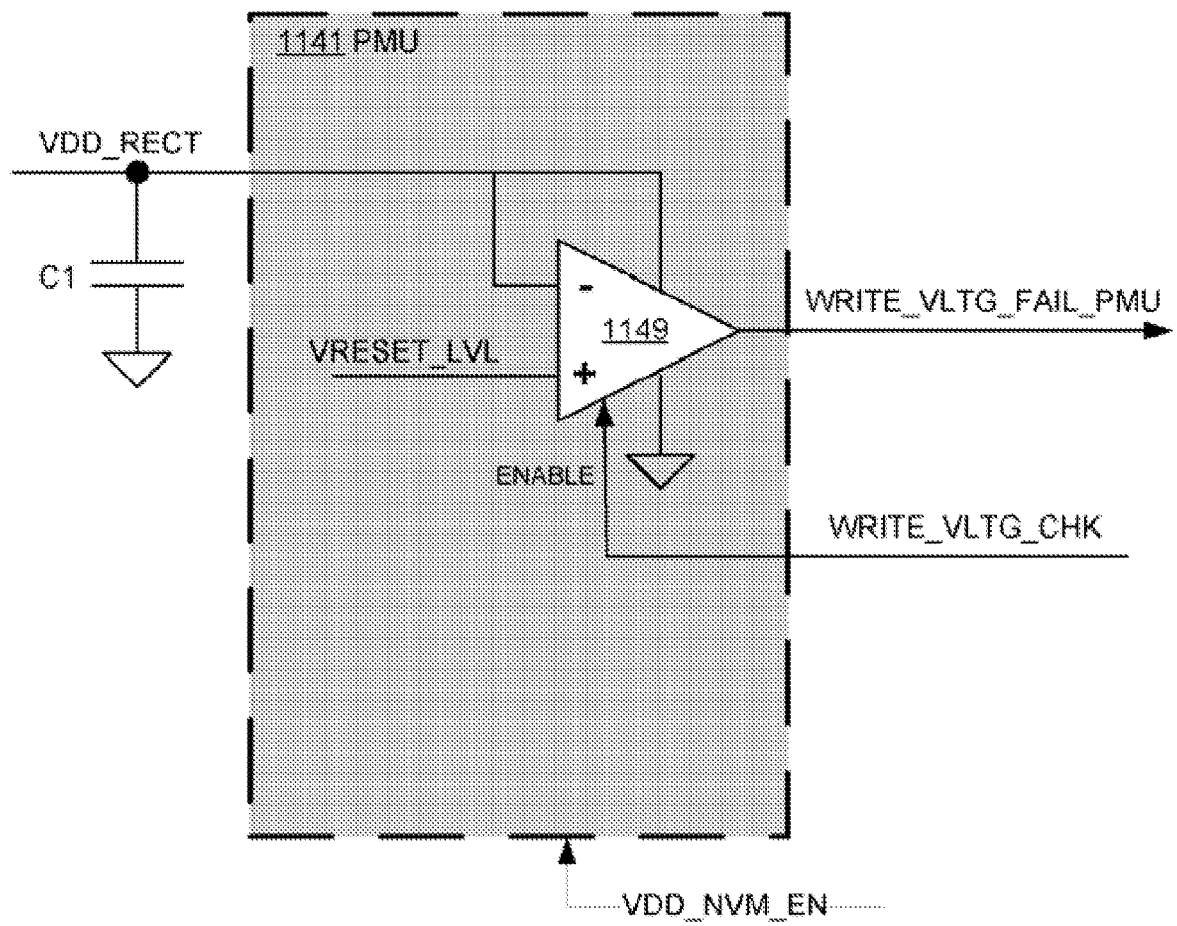
FIG. 11C is a schematic diagram of a Power Management Unit of an RFID tag with an offset comparator in a tag where the Non-Volatile Memory block and the PMU are configured to use power verification before WRITE operations according to embodiments.

FIG. 11C is a schematic diagram of a Power Management Unit of an RFID tag with an offset comparator in a tag where the Non-Volatile Memory block and the PMU are configured to use power verification before WRITE operations according to embodiments.

PMU 1141 is configured to ensure the tag does not go into a chip reset by mistake when the NVM determines sufficiency of the power level as described in conjunction with FIG. 10C.

Offset comparator 1149 is arranged to provide a WRITE_VLTG_FAIL_PMU signal indicating insufficient power level based on a comparison between rectified supply voltage VDD_RECT and a preset reset threshold voltage VRESET_LVL. As in previous two figures, an operation of offset comparator 1149 may be enabled by the tag processor through WRITE_VLTG_CHK.

Figure 11D:
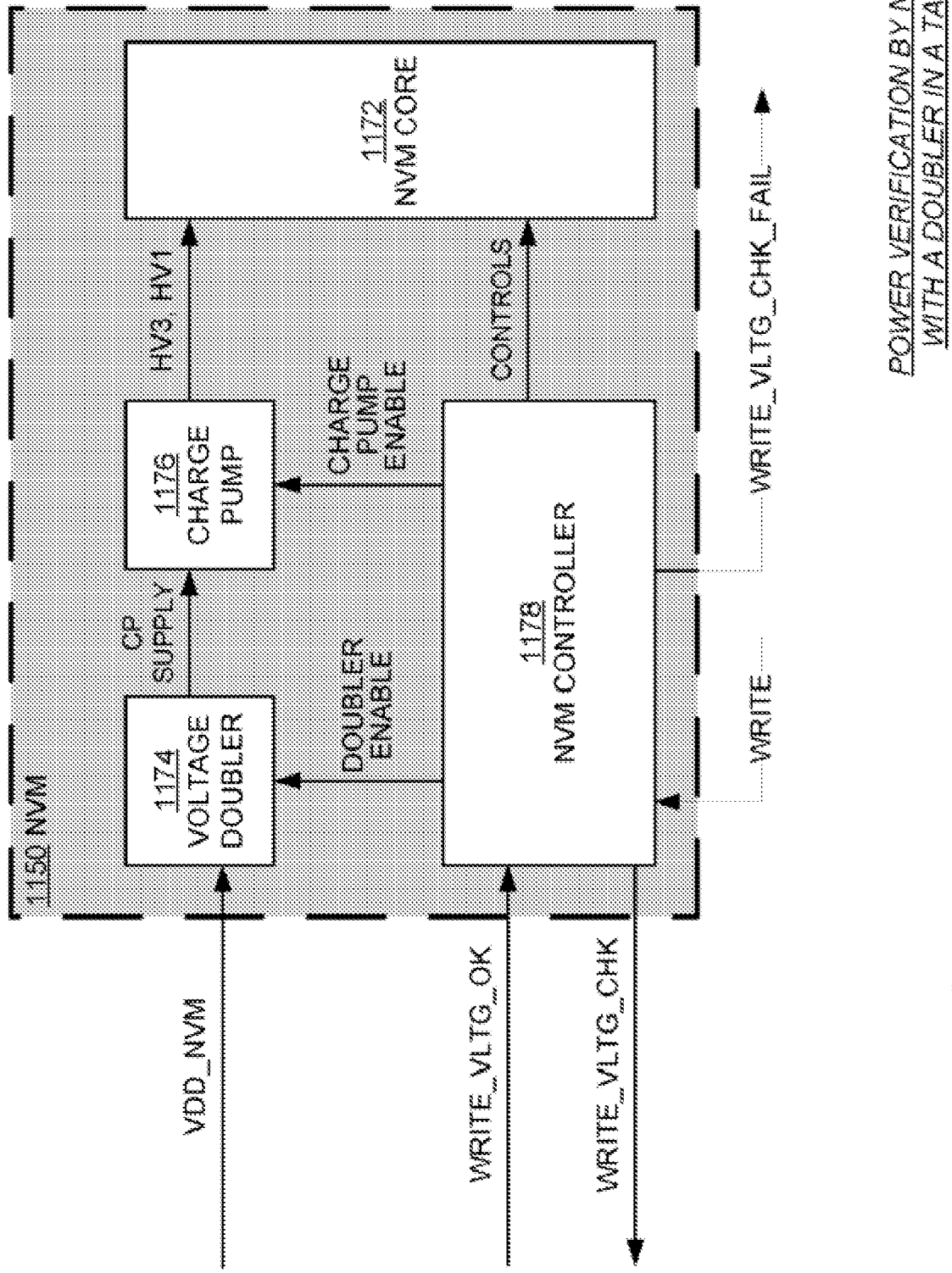
FIG. 11D is a schematic diagram of a Non-Volatile Memory block of an RFID tag including a voltage doubler and an NVM controller configured to use power verification before WRITE operations according to embodiments.

FIG. 11D is a schematic diagram of a Non-Volatile Memory block of an RFID tag including a voltage doubler and an NVM controller configured to use power verification before WRITE operations according to embodiments.

NVM 1150 includes voltage doubler 1174 for doubling input supply voltage VDD_NVM, charge pump 1176 for providing WRITE voltages HV1 and HV3 to the memory core, NVM core 1172, and NVM controller 1178.

In an operation, NVM controller 1178 is arranged to turn on voltage doubler 1174 and charge pump 1176 synchronously or sequentially (using DOUBLER ENABLE and CHARGE ENABLE) in response to receiving WRITE_VLTG_OK from the PMU indicating that the initial pretest is successful. As the individual components are turned on, power level is monitored to determine if there is adequate power to complete the WRITE operation.

If the power level drops below a preset threshold during the turning on of the components, NVM controller 1178 may provide WRITE_VLTG_CHK_FAIL indicating the WRITE operation cannot be completed.

Figure 11E:
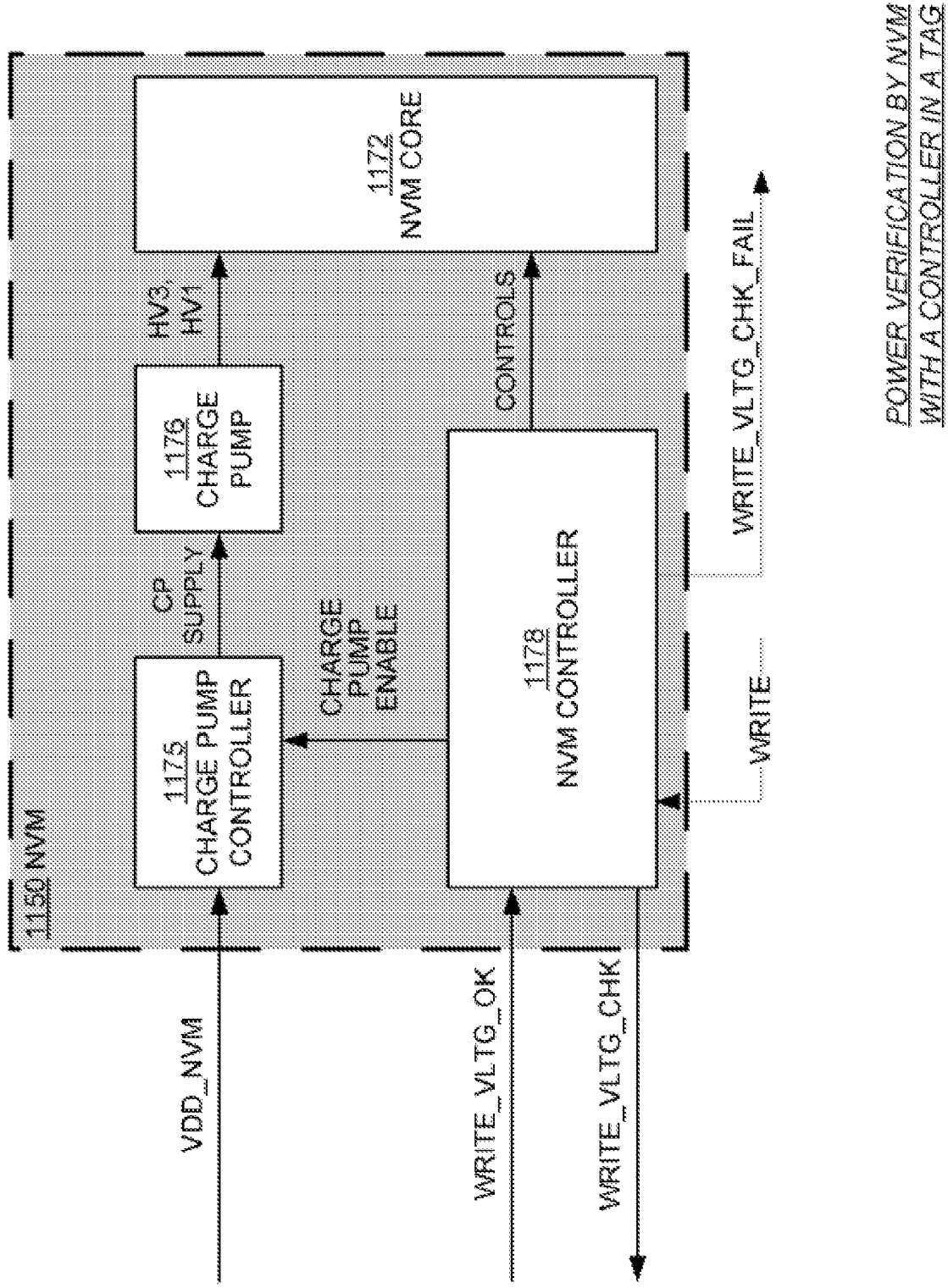
FIG. 11E is a schematic diagram of a Non-Volatile Memory block of an RFID tag including a charge pump controller and an NVM controller configured to use power verification before WRITE operations according to embodiments.

FIG. 11E is a schematic diagram of a Non-Volatile Memory block of an RFID tag including a charge pump controller and an NVM controller configured to use power verification before WRITE operations according to embodiments.

NVM 1150 in FIG. 11E is configured similar to NVM 1150 of FIG. 11D with a charge pump controller 1175 replacing the voltage doubler. In some embodiments, charge pump controller 1175 may be implemented in addition to the voltage doubler (placed either before or after the voltage doubler). Charge pump controller 1175 may be analog, digital, or a combination of both.

When individual components are to be turned on to test the power level, NVM controller 1178 may turn on the charge pump by sending a CHARGE PUMP ENABLE signal to the charge pump controller 1175.

Figure 12:
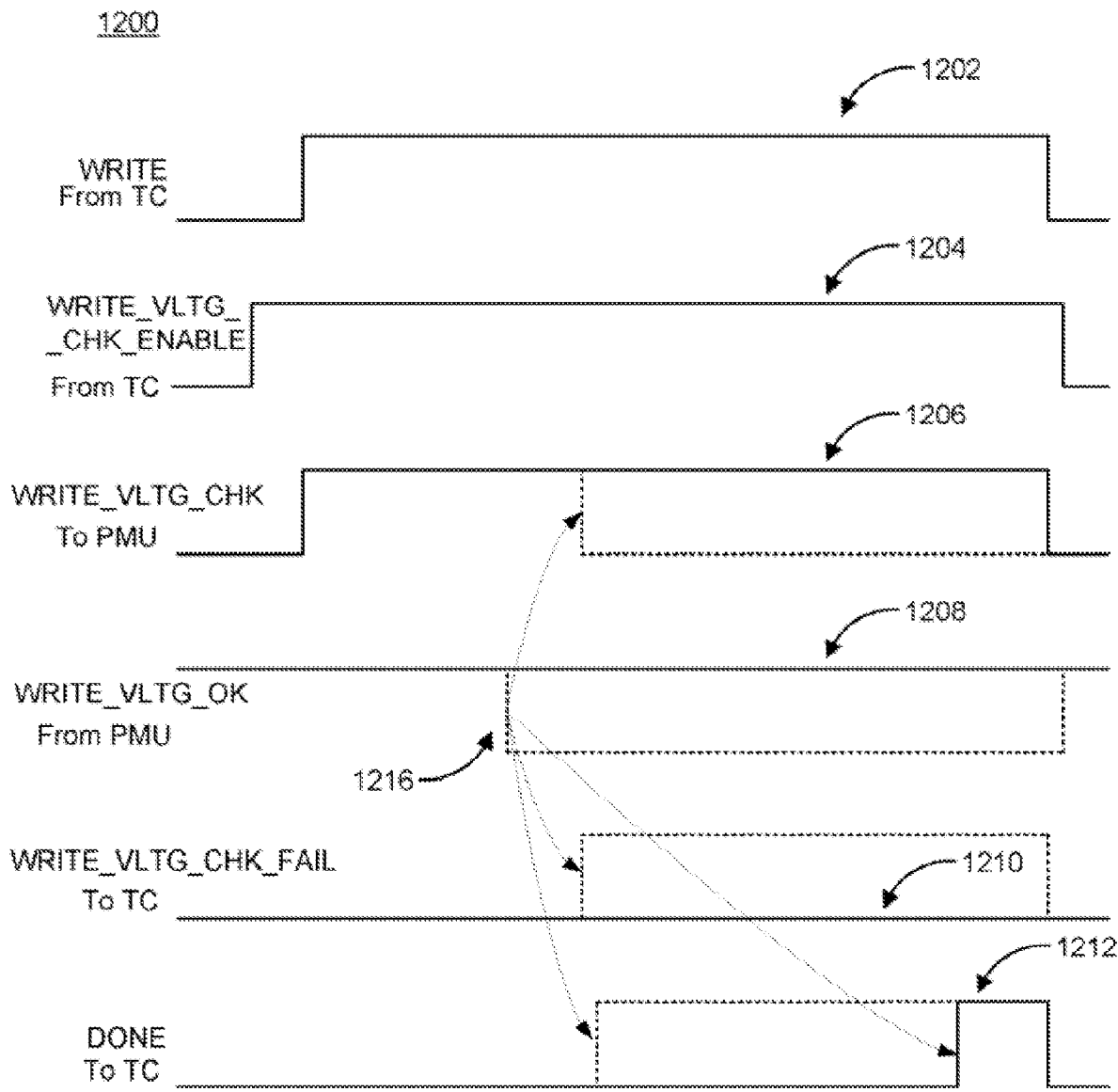
FIG. 12 is a timing diagram of signals for power verification from a PMU of an RFID tag before WRITE operations in a tag.

FIG. 12 includes timing diagram 1200 of signals for power verification from a PMU of an RFID tag before WRITE operations in a tag.

Operations associated with power adequacy checking in a tag begin with the WRITE signal (1202) being set high by the tag processor or controller (TC) in response to receiving a WRITE command from the reader.

Shortly before the WRITE signal is set to high, WRITE_VLTG_CHK_ENABLE (1204) is set high by the tag processor powering up the power adequacy test components of the PMU (e.g. offset comparator).

About the same time as the WRITE signal being set high, WRITE_VLTG_CHK (1206) signal to the PMU is also set high allowing the PMU to being power adequacy check.

In response to WRITE_VLTG_CHK (1206), the PMU performs the power adequacy test(s) as described previously providing WRITE_VLTG_OK to the tag processor indicating that the power level is sufficient as long as it is determined to be sufficient.

While WRITE_VLTG_OK (1208) is high indicating the power is sufficient, WRITE_VLTG_CHK_FAIL (1210) indicating inadequate power to the tag processor is low.

When the PMU completes the test, it responds to the tag processor with a DONE signal 1212.

If at any point during the test the power level is found to be inadequate (1216), the PMU drops WRITE_VLTG_OK (1208) to a low level. Following the drop in WRITE_VLTG_OK (1208), WRITE_VLTG_CHK_FAIL (1210) is set to a high value indicating the failure. The PMU may also send the DONE signal (1212) to the tag processor.

The tag processor, in response to receiving the lack of power indication, may drop WRITE_VLTG_CHK (1206) signal to a low value indicating to the PMU that the test can be terminated.

Figure 13:
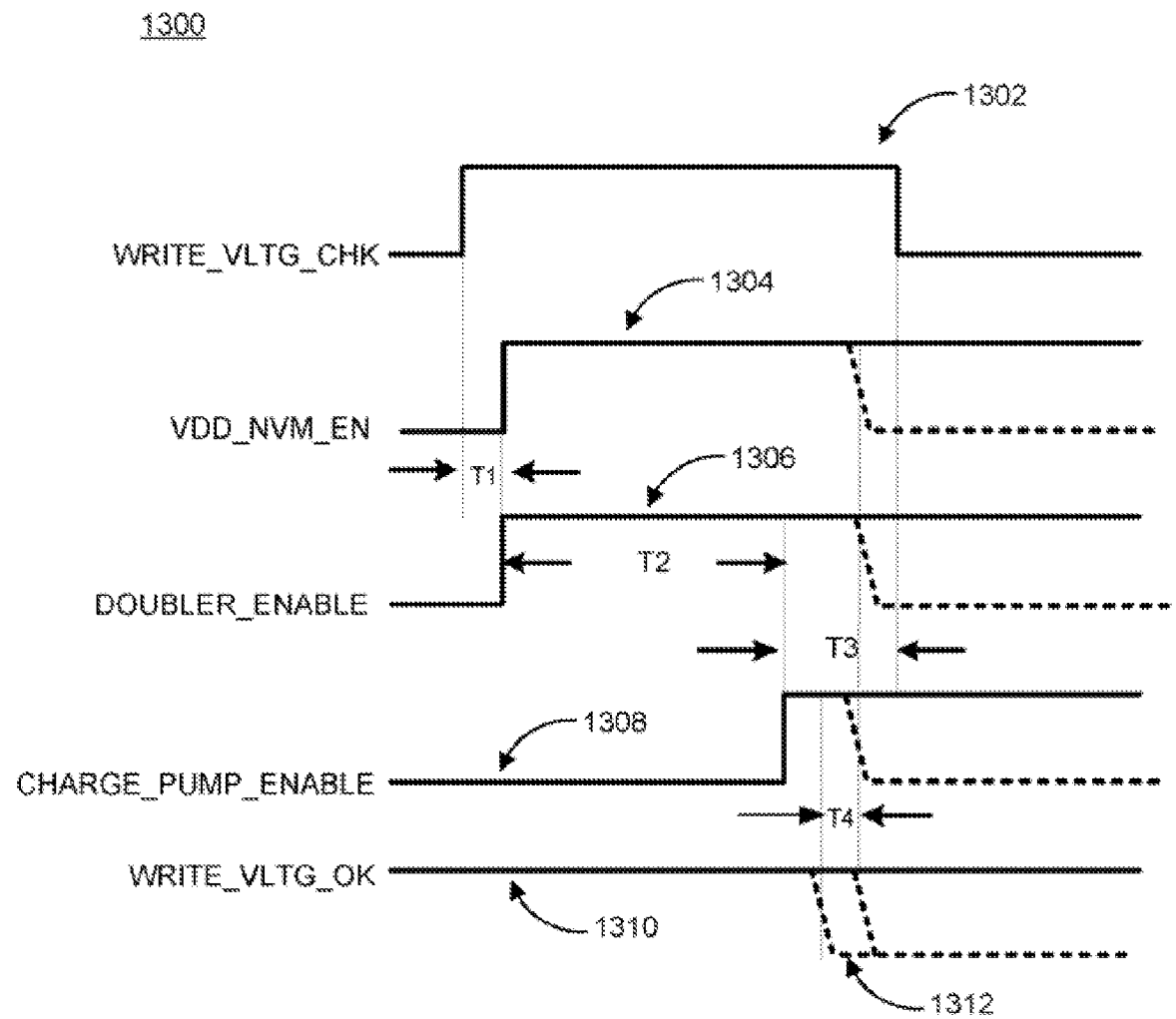
FIG. 13 is a timing diagram of enable signals in a tag associated with power verification before WRITE operations.

FIG. 13 is a timing diagram of enable signals in a tag associated with power verification before WRITE operations.

First waveform in diagram 1300 is WRITE_VLTG_CHK (1302), which indicates the beginning of the power adequacy test to the tag circuits performing the test (e.g. PMU or NVM controller).

For a period designated by T1, a preliminary check of the power level may be performed. If the power is too low, none of the components may need to be turned on for further testing of the available power.

After T1 has passed, VDD_NVM_EN (1304) and DOUBLER_ENABLE (1306) may be set to high values turning on the NVM regulator and the voltage doubler components of the NVM block. For a period of T2 following the turning on of these components, the power level may be monitored to determine if the available power is still sufficient. T2 also allows the NVM regulator and the voltage doubler to reach steady state power consumption.

If at the end of T2, the power is still adequate, a third component, the charge pump may be turned on by setting CHARGE_PUMP_ENABLE (1308) to a high value. Another steady state period T3 may be allowed to pass before determining whether the available power is still sufficient.

While the NVM components are turned on, high voltages may be passed to the NVM core, but the core may be placed in a DO NOT CARE state such that no information is actually written to the NVM core.

During the testing periods, when the power is being monitored and determined to be adequate, WRITE_VLTG_OK signal (1310) is high indicating the WRITE operation can proceed successfully.

If, at any time during the components' operation, the power level drops (e.g. any time during T4), the turned on components may be turned off, WRITE_VLTG_OK dropped to low (1312) and a message indicating inadequate power for the WRITE operation transmitted to the requesting reader.

FIGS. 14A-14D illustrate comparatively performing a power verification test according to embodiments may affect WRITE operations in an RFID tag.

Diagram 1422 in FIG. 14A illustrates performance of a WRITE command (1402) without performing a pretest to determine adequacy of available power in the tag. In this scenario, the tag has adequate power. Therefore, the WRITE command is performed successfully.

Diagram 1424 of FIG. 14B shows how the performance of a WRITE command may fail. The operation begins upon the tag receiving the WRITE command from the reader as in diagram 1422. Because the tag does not perform a pretest for power adequacy, it does not know whether the WRITE operation can be successfully completed.

In this second scenario, the tag does not have adequate power. Thus, shortly after beginning to perform the WRITE command, the tag runs out of power and the operation fails (1404). Unless the tag is configured to spare power for sending back an error message, the reader may not be able to confirm whether the WRITE command was successfully performed without checking with the tag.

Diagram 1426 of FIG. 14C illustrates how a successful WRITE operation can be performed with a power adequacy pretest. Upon receiving the WRITE command from the reader, the tag performs power adequacy test 1412. If the result of the test is positive, the WRITE operation 1406 is performed. Since power adequacy is verified before initiating the WRITE operation, the operation cannot fail due to power insufficiency.

Diagram 1426 of FIG. 14D illustrates timing of a successful WRITE operation with a power adequacy test compared to a standard WRITE operation. Because the power adequacy test consumes time, the total time for WRITE operation from the reader's perspective is longer than a standard WRITE operation. For example, if the WRITE command is received at the beginning point of WRITE operation 1402 of FIG. 14A, the pretest 1414 of FIG. 14D would begin at that point instead of the WRITE operation itself. Pretest 1414 is followed by the WRITE operation 1408, which takes the same time as the WRITE operation 1402 of FIG. 14A. Therefore, the operation shown by diagram 1428 is completed with a delay that is equal to the time it takes the tag to perform pretest 1414.

Figure 15:
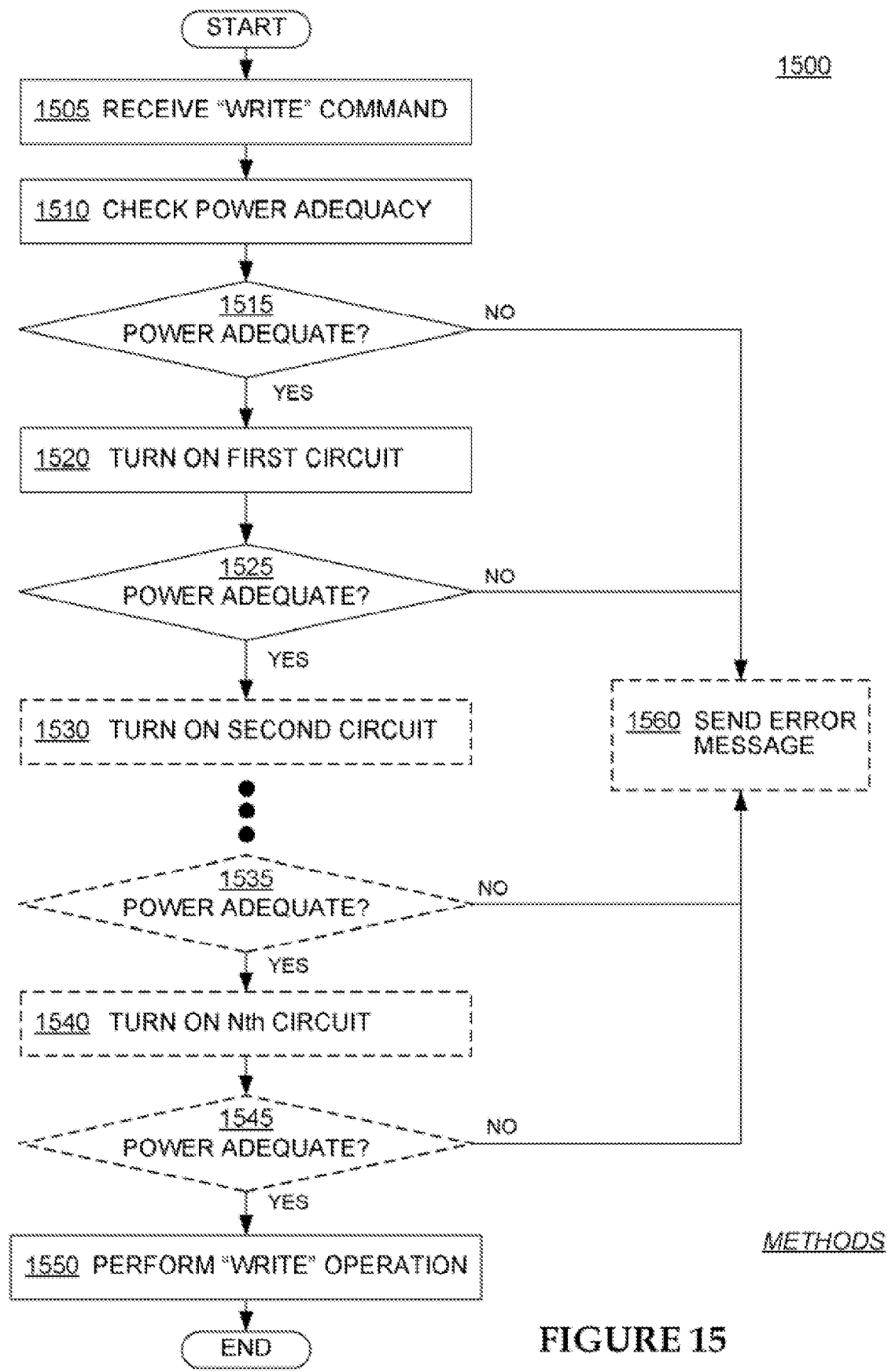
FIG. 15 is a flowchart of a process for turning multiple circuits on for power verification prior to WRITE operation in a tag according to embodiments.

FIG. 15 is a flowchart of a process for turning multiple circuits on for power verification prior to WRITE operation in a tag according to embodiments.

Process 1500 begins at operation 1505, where a WRITE command is received from a reader that requires information to be stored in a memory such as an NVM memory of the tag.

According to a next operation 1510, power adequacy is checked. This preliminary check may include simply measuring the power level available to the tag circuits, measuring a supply voltage of the tag across a known impedance, and the like.

According to a next decision operation 1515, a determination is made whether the available power level is adequate. If the power level is not adequate the tag may abort the WRITE operation and send an error message, according to a next optional operation 1560.

If the power level is adequate, a first circuit may be turned on according to a next operation 1520. The first through Nth circuit that may be turned on to test the power adequacy may be any tag circuit including, but not limited to, memory circuits, support circuits, demodulation or modulation circuits, and the like.

According to a next decision operation 1525, a determination is made whether the available power level is adequate. If the power level is not adequate the tag may abort the WRITE operation and send an error message, according to a next optional operation 1560.

If the power level is adequate, a second circuit may be turned on according to a next optional operation 1530. According to some embodiments, the first circuit may be turned off before turning on the second circuit. During a test sequence, some circuits may be on and some off. According to other embodiments, any one circuit may be on or off during a particular step of the sequence according to a predetermined pattern.

Depending on what the needed power level is for the WRITE operation and a power consumption of the individual circuits that are turned on sequentially, the sequence of checking power adequacy (optional decision operation 1535) and turning on another circuit may continue until an Nth circuit is turned on at optional operation 1540.

According to a next optional decision operation 1545, another determination is made whether the available power level is adequate. If the determination at optional decision operation 1545 is negative, the tag may abort the WRITE operation and send an error message, according to a next optional operation 1560.

If the determination at optional decision operation 1545 is affirmative, the WRITE operation is performed, according to a next optional operation 1550.

The operations included in process 1500 are for illustration purposes. Turning on multiple circuits for power verification prior to a WRITE operation in an RFID tag may be implemented by similar processes with fewer or additional steps, as well as in different order of operations using the principles described herein.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above. The programs may be executed in an RFID tag to sense the tag's power to predetermine feasibility of a requested action.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile. For example, the memory may be a portion of a tag's non-volatile memory controlled by the tag processor.

Even though it is said that the program may be stored in a computer-readable medium, it should be clear to a person skilled in the art that it need not be a single memory.

Often, for the sake of convenience only, it is desirable to implement and describe a program as software. The software can be unitary, or thought of in terms of various interconnected distinct software modules.

This detailed description is presented largely in terms of flowcharts, algorithms, and symbolic representations of operations on data bits on and/or within at least one medium that allows computational operations, such as a tag with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID tag can be implemented as a combination of hardware and software. It is advantageous to consider such a system as subdivided into components or modules. A person skilled in the art will recognize that some of these components or modules can be implemented as hardware, some as software, some as firmware, and some as a combination. Examples of such a subdivision are described above.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A method for an RFID tag, comprising:
receiving a command associated with a tag operation at a first circuit of the RFID tag from an RFID reader;
determining at a second circuit of the RFID tag, responsive to the received command, whether a power adequacy condition is met for performing the tag operation; and
if so, performing the tag operation in response to the received command, else not performing the tag operation.

2. The method of claim 1, further comprising:
if the power adequacy condition is not met, transmitting a non-compliance response.

3. The method of claim 1, further comprising:
if the power adequacy condition is not met, setting a flag.

4. The method of claim 1, further comprising:
if the power adequacy condition is not met, changing a state of the tag.

5. The method of claim 1, further comprising:
if the power adequacy condition is not met, performing an alternate tag operation in response to the received command.

6. The method of claim 1, in which
determining whether the power adequacy condition is met includes:
entering a test mode;
activating at least a third tag circuit; and
determining a power consumption attributable to activating the third tag circuit during the test mode.

7. The method of claim 6, in which
the tag operation calls for operating the third tag circuit.

8. The method of claim 6, in which
the tag operation calls for operating a circuit other than the third tag circuit.

9. The method of claim 6, in which
the power consumption is determined by comparing the available power to a power adequacy threshold.

10. The method of claim 9, in which
the power adequacy threshold is stored in a tag memory.

11. The method of claim 9, in which
the power adequacy threshold is set in response to a received command.

12. The method of claim 9, in which
the power adequacy threshold is set based on an internal state of the tag.

13. The method of claim 6, further comprising:
activating a fourth tag circuit during the test mode; and
in which the measured power consumption is due also to activating the fourth tag circuit during the test mode.

14. The method of claim 13, in which
the fourth tag circuit includes at least two subcircuits.

15. The method of claim 13, in which
the third and the fourth tag circuits are activated simultaneously.

16. The method of claim 13, in which
the third and the fourth tag circuits are activated sequentially in predetermined intervals.

17. The method of claim 16, further comprising:
terminating the sequential activation of the third and the fourth tag circuits when the available power in the tag is less than the predetermined threshold.

18. The method of claim 6, in which
the received command is a WRITE command.

19. The method of claim 18, in which
the third and the fourth tag circuits include at least one from a set of: a memory regulator, a memory charge pump, a voltage doubler, and a memory core.

20. The method of claim 18, further comprising:
transmitting a NON-WRITE error response to the RFID reader.

21. The method of claim 18, further comprising:
transmitting a "Willing To Try Again" error response to the RFID reader.

22. The method of claim 6, in which
the received command is an access command associated with a sensor on the tag.

23. The method of claim 22, in which
the tag operation includes at least one from a set of: reading the sensor, activating the sensor, calibrating the sensor, and receiving status information from the sensor.

24. The method of claim 22, in which
the third and the fourth tag circuits include at least one from a set of: the sensor, a tag memory, a random number generator, a demodulator, and an oscillator.

25. The method of claim 1, further comprising:
if the power adequacy condition is not met, deactivating at least one tag circuit, and re-determining if the power adequacy condition is met for the operation.

26. A method for an RFID tag, comprising:
determining at a first circuit of the RFID tag whether a power adequacy condition is met for performing a tag operation associated with a reader command;
receiving a command associated with the tag operation at a second circuit of the RFID tag from an RFID reader;
if the power adequacy condition is not met, transmitting a non-compliance response to the reader, else performing the tag operation in response to the received command.

27. The method of claim 26, in which
the determination of whether the power adequacy condition is met is performed continuously by the tag.

28. The method of claim 26, in which
the determination of whether the power adequacy condition is met is performed at predetermined intervals by the tag.

29. The method of claim 26, in which
the tag is powered from an unmodulated carrier wave transmitted by the reader.

30. The method of claim 26, in which
the tag is powered by a power source associated with the tag.

31. The method of claim 26, in which
determining whether the power adequacy condition is met includes:
  entering a test mode;
  activating at least a third tag circuit; and
  determining a power consumption attributable to activating the third tag circuit during the test mode.

32. The method of claim 31, in which
the power consumption is determined by comparing the available power to a power adequacy threshold.

33. The method of claim 32, in which
the power adequacy threshold is set in response to a previously received command.

34. The method of claim 32, in which
the power adequacy threshold is set based on an internal state of the tag.

35. The method of claim 31, further comprising:
activating a fourth tag circuit during the test mode, and
in which the measured power consumption is due also to activating the fourth tag circuit during the test mode.

36. The method of claim 35, in which
the third and the fourth tag circuits are activated simultaneously.

37. The method of claim 35, in which
the third and the fourth tag circuits are activated sequentially in predetermined intervals.

38. A Radio Frequency Identification (RFID) circuit for use in an RFID tag, comprising:
  a first circuit arranged to receive a command associated with a tag operation from an RFID reader; and
  a second circuit arranged to determine, responsive to the received command, whether a power adequacy condition is met for performing the tag operation, and if so to perform the tag operation in response to the received command, else not to perform the tag operation.

39. The circuit of claim 38, in which
the first circuit is further arranged to enable a third tag circuit to perform the operation in response to the received command, if the power adequacy condition is met.

40. The circuit of claim 38, in which
the first circuit and the second circuit are integrated.

41. The circuit of claim 38, in which
the first circuit is a tag processor; and
the second circuit is a Power Management Unit (PMU).

42. The circuit of claim 38, further comprising:
a rectifier circuit, coupled to at least one antenna, wherein the rectifier circuit is configured to receive a carrier wave and provide a supply voltage to tag circuits derived from the carrier wave.

43. The circuit of claim 38, in which
if the power adequacy condition is not met, the tag circuit is arranged to transmit a non-compliance response.

44. The circuit of claim 38, in which
if the power adequacy condition is not met, the first circuit is arranged to perform one of: setting a flag and changing a state of the tag.

45. The circuit of claim 38, in which
if the power adequacy condition is not met, the first circuit is arranged to perform an alternate tag operation in response to the received command.

46. The circuit of claim 38, in which
the second circuit is arranged to determine whether the power adequacy condition is met by:
  entering a test mode;
  activating at least one tag circuit; and
  determining a power consumption attributable to activating the first tag circuit during the test mode.

47. The circuit of claim 46, in which
the power consumption is determined by comparing the available power to a power adequacy threshold.

48. The circuit of claim 47, in which
the power adequacy threshold is stored in a tag memory.

49. The circuit of claim 47, in which
the power adequacy threshold is set in response to a received command.

50. The circuit of claim 47, in which
the power adequacy threshold is set based on an internal state of the tag.

51. The circuit of claim 46, in which
the second circuit is further arranged to activate another tag circuit to determine whether the power adequacy condition is met.

52. The circuit of claim 51, in which
the other tag circuit includes at least two subcircuits.

53. The circuit of claim 51, in which
the at least one tag circuit and the other tag circuit are activated simultaneously.

54. The circuit of claim 51, in which
the at least one tag circuit and the other circuit are activated sequentially in predetermined intervals.

55. The circuit of claim 51, in which
the received command is a WRITE command.

56. The circuit of claim 55, in which
the at least one tag circuit and the other tag circuit include at least one from a set of: a memory regulator, a memory charge pump, a voltage doubler, and a memory core.

57. The circuit of claim 55, in which
the tag circuit is further configured to transmit a NON-WRITE error response to the RFID reader.

58. The circuit of claim 55, in which
the tag circuit is further configured to transmit a "Willing To Try Again" error response to the RFID reader.

59. The circuit of claim 38, in which
the received command is an access command associated with a sensor on the tag.

60. The circuit of claim 59, in which
the tag operation includes at least one from a set of: reading the sensor, activating the sensor, calibrating the sensor, and receiving status information from the sensor.

61. The circuit of claim 59, in which
the second circuit includes at least one from a set of: the sensor, a tag memory, a random number generator, a demodulator, and an oscillator.

62. The circuit of claim 38, in which
if the power adequacy condition is not met, the second circuit is further configured to deactivate at least one tag circuit, and to re-determine if the power adequacy condition is met for the operation.

63. A Radio Frequency Identification (RFID) circuit for use in an RFID tag, comprising:
- a first circuit arranged to determine whether a power adequacy condition is met for performing a tag operation;
- a second circuit arranged to receive a command associated with the tag operation from an RFID reader; and
- a third circuit arranged to transmit a non-compliance response to the reader if the power adequacy condition is not met, else to perform the tag operation in response to the received command.

64. The circuit of claim 63, in which
the third circuit is further arranged to enable a fourth tag circuit to perform the operation in response to the received command, if the power adequacy condition is met.

65. The circuit of claim 63, in which
the first circuit is arranged to determine if the power adequacy condition is met by performing one of: a continuous check and a periodic check of the power adequacy condition.

66. The circuit of claim 63, in which
the tag is powered from one of an unmodulated carrier wave transmitted by the reader and a power source associated with the tag.

67. The circuit of claim 63, in which
the first circuit is arranged to determine if the power adequacy condition is met by:
- entering a test mode;
- activating a plurality of tag circuits; and
- determining a power consumption attributable to activating the plurality of tag circuits during the test mode.

68. The circuit of claim 67, in which
the plurality of tag circuits are activated simultaneously.

69. The circuit of claim 67, in which
the plurality of tag circuits are activated sequentially in predetermined intervals.

70. The circuit of claim 67, in which
the power consumption is determined by comparing the available power to a power adequacy threshold.

71. The circuit of claim 70, in which
the power adequacy threshold is set based on one of a previously received command and an internal state of the tag.

72. A Radio Frequency Identification (RFID) tag, comprising:
- at least one antenna;
- a rectifier circuit, coupled to the at least one antenna, wherein the rectifier circuit is configured to receive a carrier wave and provide a supply voltage to tag circuits derived from the carrier wave;
- a tag processor arranged to receive a command associated with a tag operation from an RFID reader; and
- a Power Management Unit (PMU) arranged to determine, responsive to the received command, whether a power adequacy condition is met for performing the tag operation, and if so to perform the tag operation in response to the received command, else not to perform the tag operation.

73. The RFID tag of claim 72, in which
the tag processor is further arranged to enable a third tag circuit to perform the operation in response to the received command, if the power adequacy condition is met.

74. The RFID tag of claim 72, in which
if the power adequacy condition is not met, the tag processor is arranged to perform at least one of: setting a flag, changing a state of the tag, and causing the tag to transmit a non-compliance response.

75. The RFID tag of claim 72, in which
the PMU is arranged to determine whether the power adequacy condition is met by:
- entering a test mode;
- activating at least one tag circuit from a set of: a memory regulator, a memory charge pump, a voltage doubler, a memory core, a sensor, a random number generator, a demodulator, and an oscillator; and
- determining a power consumption attributable to activating the first tag circuit during the test mode.

76. The RFID tag of claim 72, in which
at least a portion of the tag circuits are integrated.

* * * * *

UNITED STATES PATENT AND TRADEMARK OFFICE
CERTIFICATE OF CORRECTION

PATENT NO. : 7,733,227 B1  Page 1 of 1
APPLICATION NO. : 11/624197
DATED : June 8, 2010
INVENTOR(S) : Pesavento et al.

It is certified that error appears in the above-identified patent and that said Letters Patent is hereby corrected as shown below:

Delete "data," on column 1, line 35 and insert --date,-- therefor.

Delete "EPC global," on column 5, line 53-54 and insert --EPCglobal,-- therefor.

Delete "on" on column 6, line 5 and insert --onto-- therefor.

Delete "optical" on column 11, line 23 and insert --optional-- therefor.

Delete "mode;" on column 18, line 16 in claim 13 and insert --mode,-- therefor.

Signed and Sealed this

Twenty-first Day of September, 2010

David J. Kappos
*Director of the United States Patent and Trademark Office*